United States Patent [19]

Kondo et al.

[11] Patent Number: 5,692,867
[45] Date of Patent: Dec. 2, 1997

[54] PARTS SUPPLY SYSTEM

[75] Inventors: Mitsuhiro Kondo, Isehara; Akira Taruishi, Atsugi; Hayato Suzuki, Sagamihara; Akira Kamimura, Atsugi, all of Japan

[73] Assignee: Ricoh Company, Ltd., Tokyo, Japan

[21] Appl. No.: 733,195

[22] Filed: Oct. 17, 1996

Related U.S. Application Data

[63] Continuation of Ser. No. 365,108, Dec. 28, 1994, abandoned.

[30] Foreign Application Priority Data

Dec. 28, 1993 [JP] Japan ................... 5-351416
Nov. 21, 1994 [JP] Japan ................... 6-286624

[51] Int. Cl.⁶ ................................. B65G 1/00
[52] U.S. Cl. .................. 414/268; 414/270; 414/331; 414/416
[58] Field of Search ........................ 414/268, 270, 414/278, 286, 331, 416

[56] References Cited

U.S. PATENT DOCUMENTS

| | | | |
|---|---|---|---|
| 4,651,863 | 3/1987 | Reuter et al. | 414/331 |
| 4,669,047 | 5/1987 | Chucta | 414/331 |
| 4,932,828 | 6/1990 | Katae et al. | 414/416 X |
| 4,946,340 | 8/1990 | Murphy et al. | 414/416 X |
| 4,971,513 | 11/1990 | Bergerioux et al. | 414/285 X |
| 4,993,906 | 2/1991 | Nisimura et al. | 414/286 |
| 5,018,927 | 5/1991 | Tanaka | 414/278 |
| 5,120,178 | 6/1992 | Ito | 414/416 X |
| 5,156,514 | 10/1992 | Zah | 414/278 |
| 5,171,120 | 12/1992 | Bernard, II et al. | 414/331 |
| 5,190,434 | 3/1993 | Miura et al. | 414/416 X |
| 5,203,661 | 4/1993 | Tanita et al. | 414/331 |
| 5,358,375 | 10/1994 | Kawada et al. | 414/277 |
| 5,411,151 | 5/1995 | Sasada | 414/331 X |

FOREIGN PATENT DOCUMENTS

| | | | |
|---|---|---|---|
| 0275310 | 11/1989 | Japan | 414/286 |
| 4018234 | 1/1992 | Japan | 414/278 |
| 4116001 | 4/1992 | Japan | 414/270 |

*Primary Examiner*—James W. Keenan
*Attorney, Agent, or Firm*—Oblon, Spivak, McClelland, Maier & Neustadt, P.C.

[57] ABSTRACT

In facilities for the automatic assembly of mechanical parts, a parts supply system has a storing section for storing a tray loaded with parts, a conveying mechanism for conveying the tray from the storing section, and a circulation mechanism for circulating a tray carrier to be loaded with the tray along a circulation path which includes at least a tray loading position for receiving the tray conveyed by the conveying mechanism, a pars supply position for allowing a robot to pick up the parts stored in the tray, and a tray discharge position for discharging the tray. The device simplifies the mechanical arrangement, enhances high speed processing, and readily adapts to a change in the kind of parts and an increase or decrease in the number of parts.

9 Claims, 29 Drawing Sheets

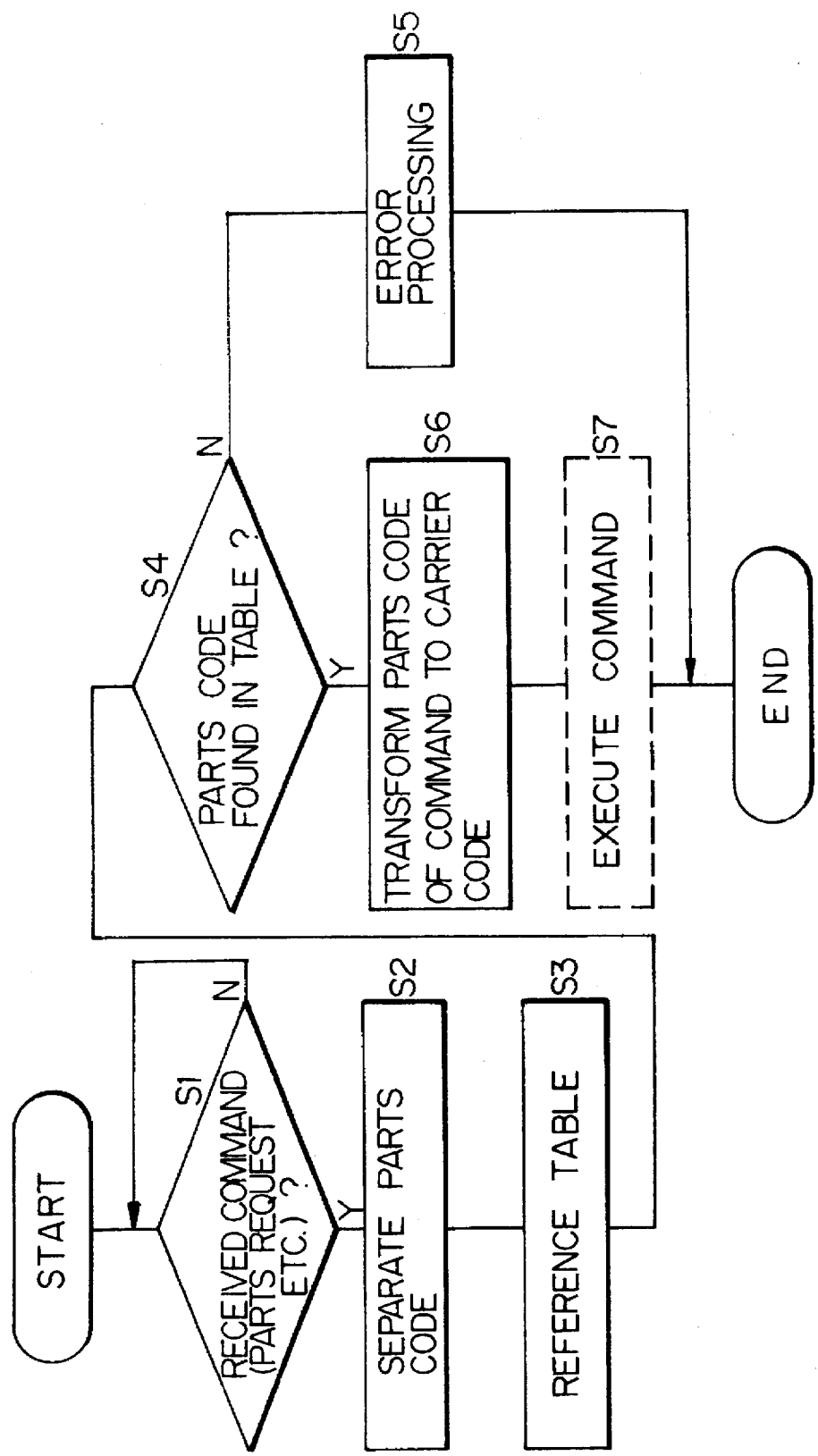

Fig. 4B

| PARTS CODE (TRAY READ DEVICE) | CARRIER CODE (CARRIER READ DEVICE) |
|---|---|
| 1234 | 1 |
| 3456 | 2 |
| 5678 | 3 |
| 7890 | 4 |

Fig. 4C

| PARTS CODE (TRAY READ DEVICE) | CARRIER CODE (CARRIER READ DEVICE) | SHIFT → | PARTS CODE (TRAY READ DEVICE) | CARRIER CODE (CARRIER READ DEVICE) | |
|---|---|---|---|---|---|
| 1234 | 1 | | 7890 | 4 | TRAY LOAD POSITION |
| 3456 | 2 | | 1234 | 1 | PARTS SUPPLY POSITION |
| 5678 | 3 | | 3456 | 2 | |
| 7890 | 4 | | 5678 | 3 | TRAY DISCHARGE POSITION |

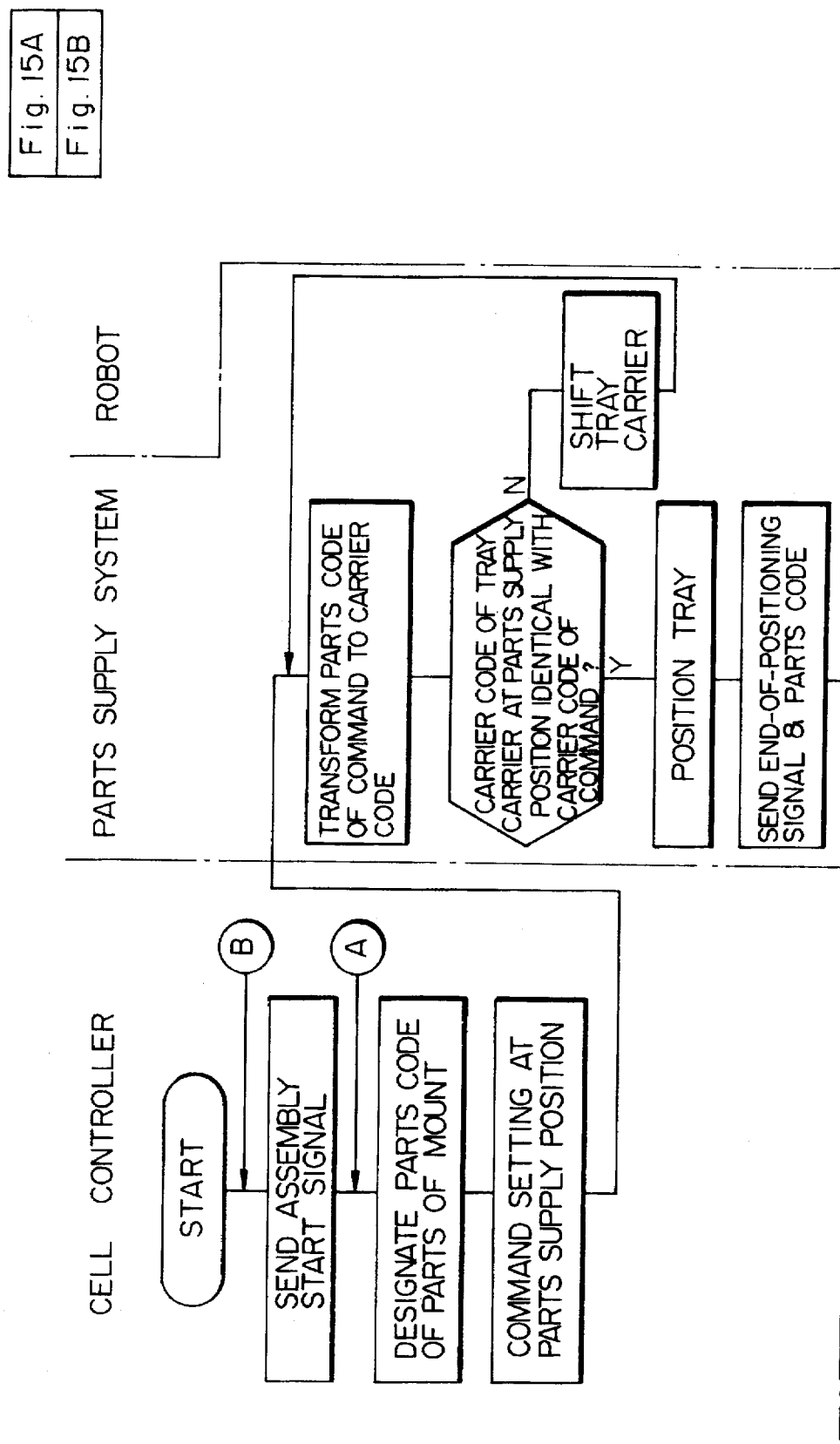

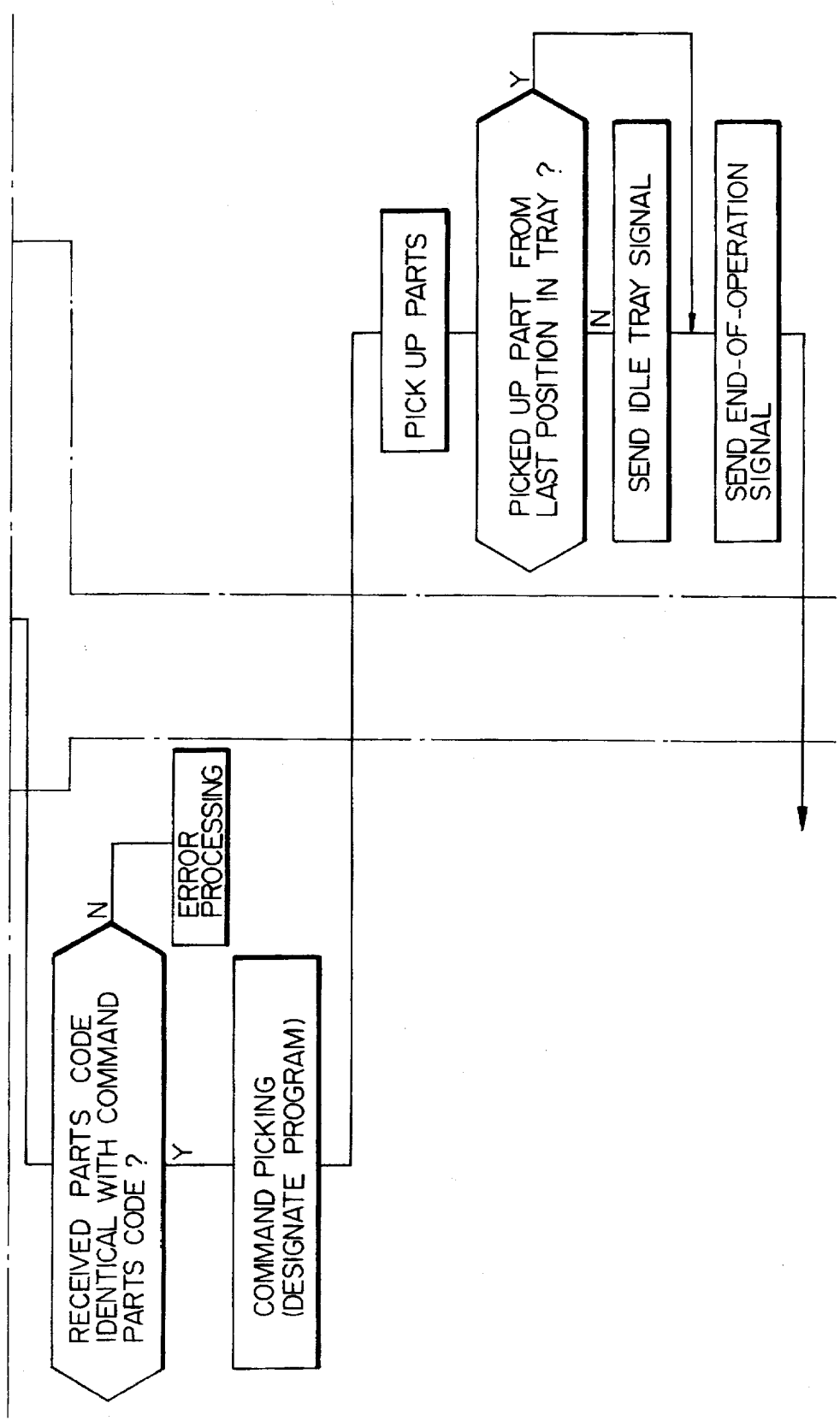

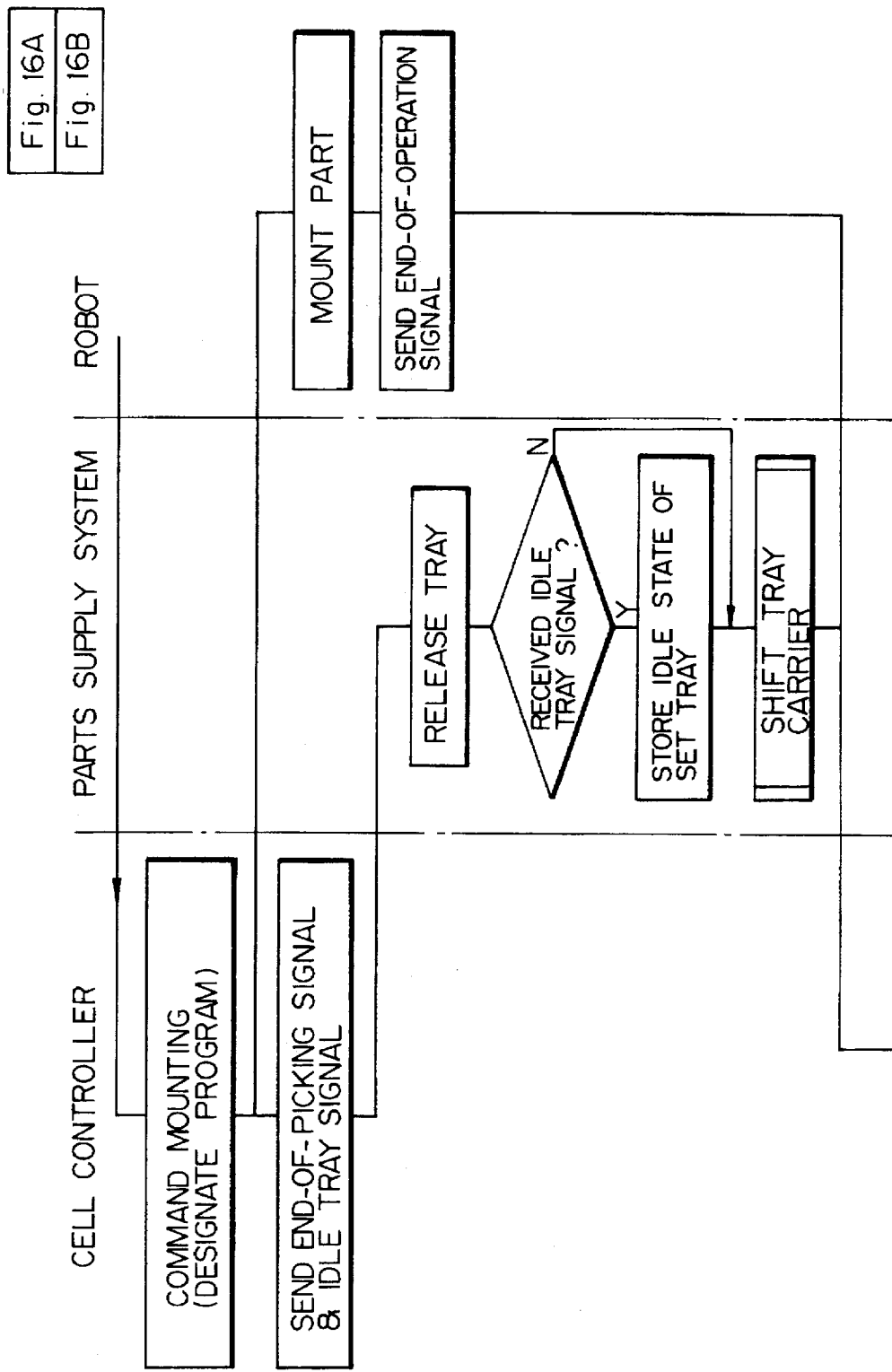

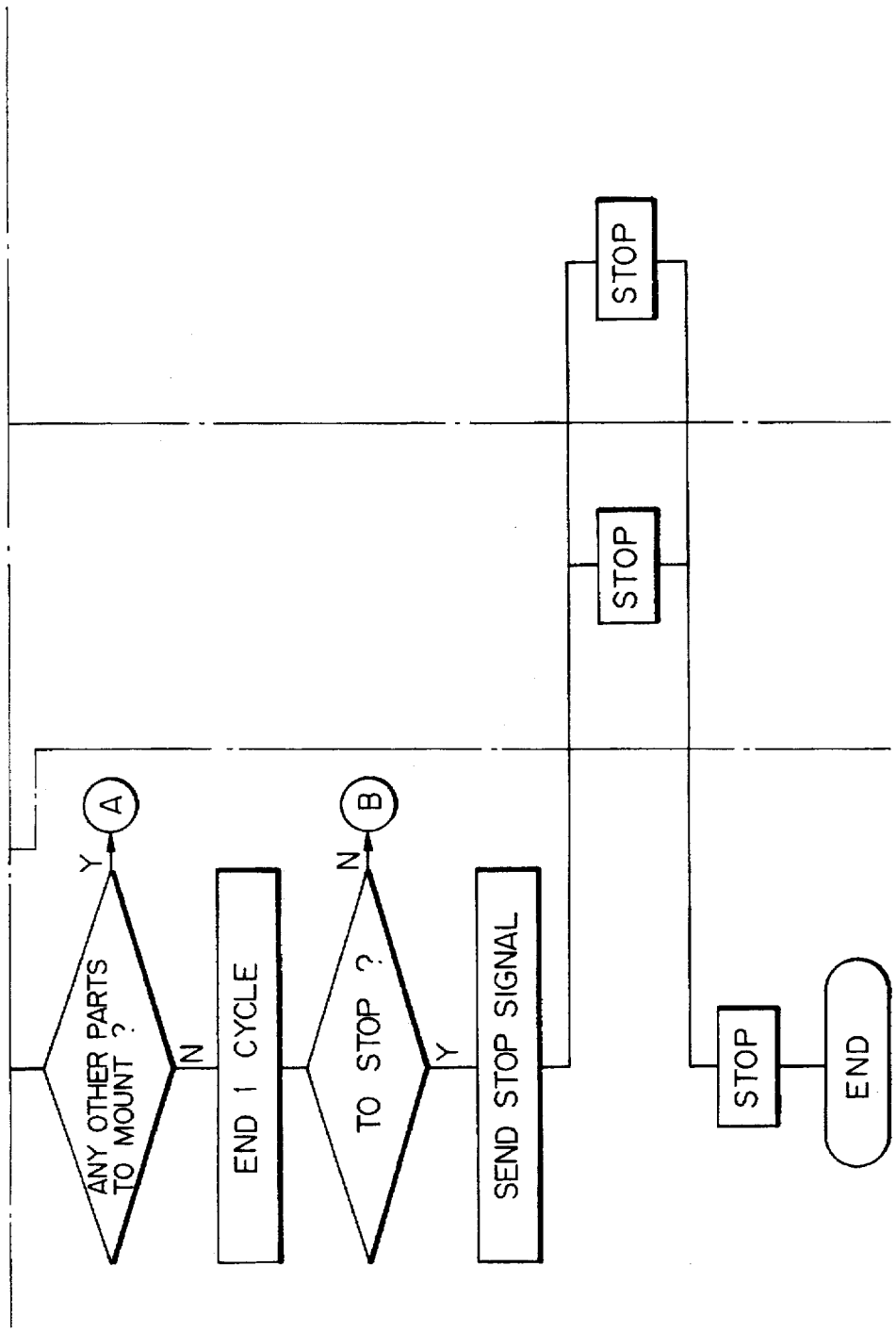

PARTS SUPPLY SYSTEM

This application is a continuation of application Ser. No. 08/365,108, filed on Dec. 28, 1994, now abandoned.

BACKGROUND OF THE INVENTION

The present invention relates to facilities for the automatic assembly of mechanical parts and, more particularly, to a parts supply system for automatically and continuously supplying a plurality of kinds of parts to a robot installed in such facilities.

A parts supply system for the above application is disclosed in, for example, Japanese Patent Laid-Open Publication No. 1-40236 and capable of automatically supplying parts to a robot at high speed. The conventional parts supply system has a buffer for receiving a stack of trays each storing a particular kind of parts from an unmanned vehicle. A separating mechanism is included in the buffer and separates one of the trays from the overlying and underlying trays and transfers it to an elevator. A stocker has a plurality of stocking positions arranged in the vertical direction and each storing a particular kind of parts. The stocker is movable up and down to supply the parts to a robot. The elevator moves the separated tray to one of the stocking positions of the stocker which should be replenished with parts. The stocker is raised or lowered to replace an empty tray dealt with by the robot with the full tray brought thereto by the stocker. The full tray is pulled out from the stocker to supply parts to the robot. On the other hand, the elevator is further lowered to put the empty tray on the top of a stack of empty trays. These empty trays are collectively transferred from the elevator to the bottom portion of the unmanned vehicle.

The conventional parts supply system described above has the following problems left unsolved.

(1) In the buffer, one tray must be separated from both the overlying trays and the underlying trays. Therefore, it is necessary to memorize all the trays stacked on the buffer, their heights, and the kinds of parts contained in the respective trays, and to compute a height for effecting the separation. This is not practicable without resorting to a control unit having advanced storing and computing functions. In addition, the separating mechanism and control are complicated. Moreover, when the number and the kind of parts to be assembled, particularly the height of a tray, is changed, the control program must be modified at the cost of time, labor and expense.

(2) The stocker must move up and down in order to supply the robot with parts from the trays each containing a particular kind of parts at a predetermined height and to replace the empty and full trays at a predetermined height. In addition, the tray containing a required kind of parts must be pulled out in order to supply them to the robot. As a result, the structure of the stocker and the control are complicated.

(3) In the event of replacement, the empty tray is pulled out of the stocker, and then the full tray is pushed into the stocker. These two movements occur alternately and in the opposite directions to each other. Hence, the replacement consumes a disproportionate time and further complicates the structure and control.

(4) Since the parts supply system is constructed into integral equipment, it cannot readily adapt to a change in the number of parts and must maintain, even when the number of parts is reduced, a condition capable of accommodating the maximum number of parts.

(5) Usually, a manual control function is required which can cause each section of the device to operate independently of the others for adjustment or removal of an error. It has been customary to provide this kind of device with manual control switches for the respective sections. This is problematic since the switches are not needed while the device is normal and, therefore, waste space, time, and cost.

SUMMARY OF THE INVENTION

It is, therefore, an object of the present invention to provide a parts supply system which has a simple construction and high processing speed and adapts to a change in the number and kind of parts easily.

In accordance with the present invention, a parts supply system has a storing section for storing a tray loaded with parts, a conveying mechanism for conveying the tray from the storing section, and a circulation mechanism for circulating a tray carrier to be loaded with the tray along a circulation path which includes at least a tray loading position for receiving the tray conveyed by the conveying mechanism, a parts supply position for allowing a robot to pick up the parts stored in the tray, and a tray discharge position for discharging said tray.

Also, in accordance with the present invention, a parts supply device has a tray storing parts in a condition ready to be picked up by a robot and provided with a tray mark representing the kind of the parts in a position thereof where the tray mark is readable, a plurality of tray carriers capable of being loaded with the tray, and each being provided with a particular carrier mark in a position thereof where the carrier mark is readable, a tray changer for sequentially moving, in accordance with an assembly order, the plurality of tray carriers to a position where a robot is to pick up the parts, a tray reading device for reading with a sensor the tray mark of the tray to be mounted to one of the plurality of tray carriers which is located at a tray loading position, and for outputting a parts code representing the kind of the parts stored in the tray, a carrier reading device for reading with a sensor the carrier mark of the one tray carrier and for outputting a carrier code for identifying the one tray carrier, a table for storing the carrier code from the carrier reading device and the parts code from the tray reading device in a pair, and a control processor for referencing, in response to a command designating a parts code from a host, the table, for converting the parts code included in the command to a carrier code matching the parts code, and for executing the command on the basis of the carrier code.

BRIEF DESCRIPTION OF THE DRAWINGS

The above and other objects, features and advantages of the present invention will become more apparent from the following detailed description taken with the accompanying drawings in which:

FIGS. 4A–4C show the conversion of a part code;

FIGS. 14–23 are flowcharts each demonstrating a particular control procedure available with the present invention.

DESCRIPTION OF THE PREFERRED EMBODIMENT

Figure 24:
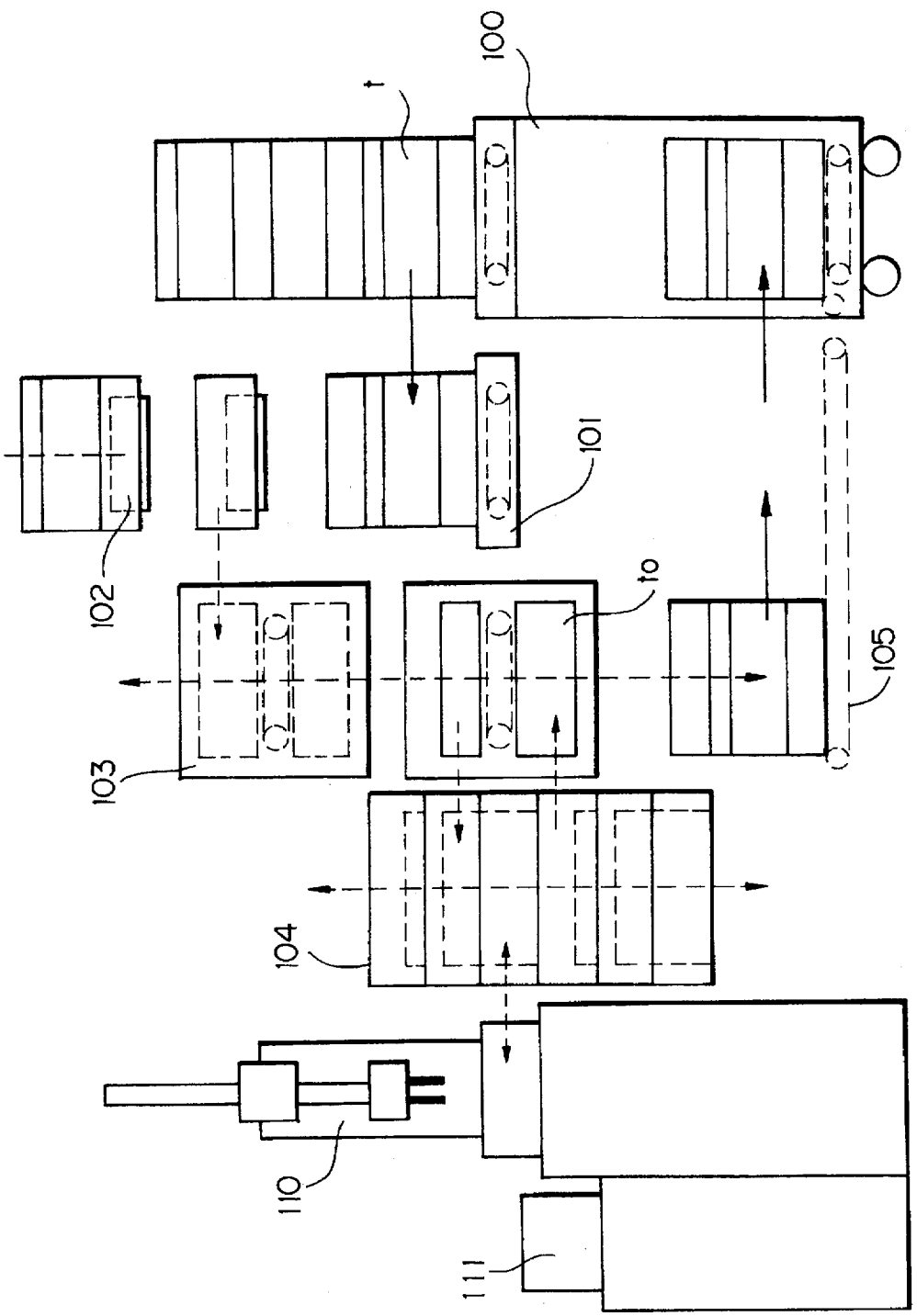
FIG. 24 is a view of a conventional parts supply system.

To better understand the present invention, a brief reference will be made to a conventional parts supply system, shown in FIG. 24. As shown, the system includes a stack of trays t each containing a particular kind of parts. The trays t are transferred from an unmanned vehicle 100 to a buffer 101 by, for example, a conveyor. A separating mechanism 102 is associated with the buffer 101 for separating one of the trays t containing a necessary kind of parts from the other trays t. The mechanism 102 lifts the necessary tray t together with the trays t stacked on it and then lifts the latter away from the former. Then, the mechanism 102 pushes the separated tray t toward an elevator 103 having a conveyor.

The elevator 103 moves upward or downward until the upper surface of the conveyor become flush with the separated tray t, and receives the tray t from the mechanism 102 by driving the conveyor. Subsequently, the elevator 103 moves upward or downward until the tray t reaches a height coincident with a stock position of a stocker 104 which is assigned to the tray t, and then drives the conveyor to transfer the tray t to such a stock position. At this instant, the tray t at the stock position is coincident in height with a feed table included in a robot 110. The stocker 104 pushes the tray t onto the feed table. The robot 110 picks up one of the parts from the tray t and mounts it to a work 111. Subsequently, the tray t is returned from the feed table to the stock position of the elevator 103. Then, the elevator 103 is moved upward or downward to bring another tray storing parts to be fed next to the position coincident with the feed table. Such a procedure is repeated to sequentially feed different kinds of parts to the robot 110.

After all the parts stored in the tray t have been picked up by the robot 110, the empty tray t is shifted from the stocker 104 to below the conveyor of the elevator 103. Then, the elevator 103 moves downward to stack the empty tray t on the top of empty trays existing on a conveyor 105. As the conveyor 105 is driven, it conveys the stack of empty trays t to a table disposed on the bottom of the vehicle 100. The vehicle 100 transports the empty trays t to an unmanned warehouse or similar predetermined location.

The conventional parts feeding system described above have the problems (1)–(5) discussed earlier.

Figure 1:
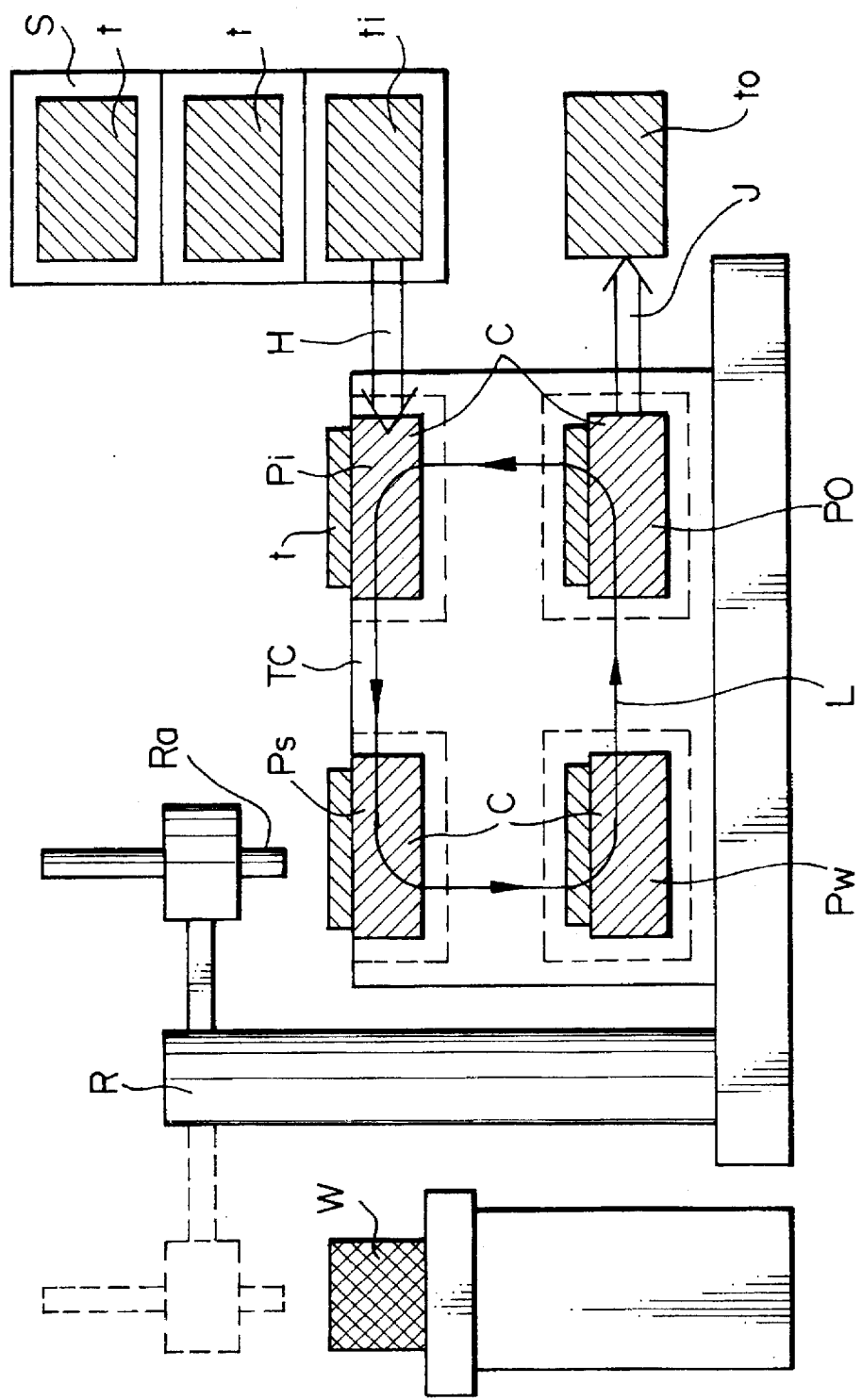
FIG. 1 is a view representing the principle of the present invention.

Referring to FIG. 1, there is shown the principle of a circulation mechanism TC included in a parts supply system embodying the present invention. As shown, the mechanism TC loads a tray carrier C with a tray t storing a particular kind of parts at a tray loading position Pi, conveys the tray carrier C to a parts supply position Ps, and causes a robot R to pick up one of the parts at the position Ps and mount it to a work W. Preferably, a plurality of tray carriers C should be included in the mechanism TC in order to supply parts to the robot R sequentially at short intervals. In the illustrative embodiment, the mechanism TC includes four tray carriers by way of example. While each tray t may contain parts of the same kind or of different kinds, it should preferably store parts of the same kind to facilitate the supplement and control of parts.

Specifically, the mechanism TC moves, in a circulation cycle, the tray carrier C loaded with the tray t from the tray loading position Pi to the parts supply position Ps along a circulation path L. The robot R can pick up necessary one of the parts from the tray t at the position Ps. In the next circulation cycle, the mechanism TC moves the tray carrier C to the next position, e.g., a waiting position Pw or a tray discharge position Po.

Assume that the robot R continuously picks up a plurality of parts of the same kind or of different kinds from the tray t while mounting them to the work W. Then, the mechanism TC may be so controlled as to hold the tray carrier C carrying the tray t at the position Ps until all the necessary parts have been picked up by the robot R. When a plurality of tray carriers C1, C2, . . . , Cn are used, the next tray carrier loaded with another tray t is brought to the parts supply position Ps by the consecutive circulation cycles.

After the robot R has picked up all the parts from the tray t carried on the tray carrier C, it is necessary to remove the empty tray t from the tray carrier C. In the embodiment, when the empty tray t is brought to the tray discharge position Po on the circulation path L, discharging means J removes it from the tray carrier C and discharges it to the outside.

When the parts stored in the tray t of the tray carrier C brought to the tray discharge position Po should be again picked up by the robot R, the tray t may be left on the tray carrier C without being discharged. Then, such a tray t will be again conveyed to the parts supply position Ps via the tray loading position Pi. Further, after the parts stored in the tray t have been mounted to the work W or when the parts of the tray t are needless, e.g., when the kind of parts is changed, such a tray t may be driven out via the tray discharge position Po by the discharging mechanism J in the same manner as the empty tray t.

After the tray t has been removed from the tray carrier C, the empty carrier C is again brought to the tray loading position Pi by a circulation cycle. Then, a tray ti storing a particular parts and picked out from a storage S is conveyed onto the empty tray carrier C by conveying means H. When the parts stored in a given tray t run short, a new tray t' storing the same kind of parts as that tray t may be selected out of the storage S or may even be conveyed halfway beforehand. Then, when a tray carrier C from which an empty tray t has been removed at the tray discharge position Po arrives at the tray loading position Pi, the new tray produced from the storage S can be transferred to the carrier C rapidly.

In the system outlined above, the robot R is supplied with parts stored in a tray t which has been mounted to a tray carrier C at the tray loading position Pi. Hence, to change the kind of parts, it is only necessary to select a tray t storing required parts out of the storage S and mount it to a tray carrier C. Hence, the control over the circulation mechanism TC does not have to be changed even when the kind of parts is changed.

A plurality of tray carriers C1, C2, . . . , Cn may be included in the circulation mechanism TC and moved at the same time by way of at least the three positions Pi, Ps and Po. This allows the robot R to sequentially receive different kinds of parts from trays t1, t2, . . . , tn mounted on the tray carriers C1, 2, . . . , Cn, thereby reducing the waiting time of the robot R. Specifically, as shown in FIG. 1, assume that the circulation mechanism TC has four tray carriers and feeds four different kinds of parts to the robot R. Then, if four trays each storing parts of the same kind are respectively mounted to the tray carriers and if such tray carriers are circulated by the mechanism TC, the trays arrive at the parts supply position Ps one after another according to the circulation cycle. This allows the robot R to pick up one of the parts from the tray t at the position Ps in every circulation cycle and, therefore, to pick up four different kinds of parts one after another.

The tray carriers C1, C2, . . . , Cn may be affixed to the circulation mechanism TC at fixed intervals such that when the tray carrier C1, for example, is located at the tray loading position Pi, the other tray carriers C2 and C3 are respectively located at at least the parts supply position Ps and tray discharge position Po. Then, the mounting of a tray t to the tray carrier C1, the pick-up of one part by the robot R and the discharge of an empty tray or needless tray can be effected at the same time, noticeably reducing the time necessary for such processing.

Figure 2:
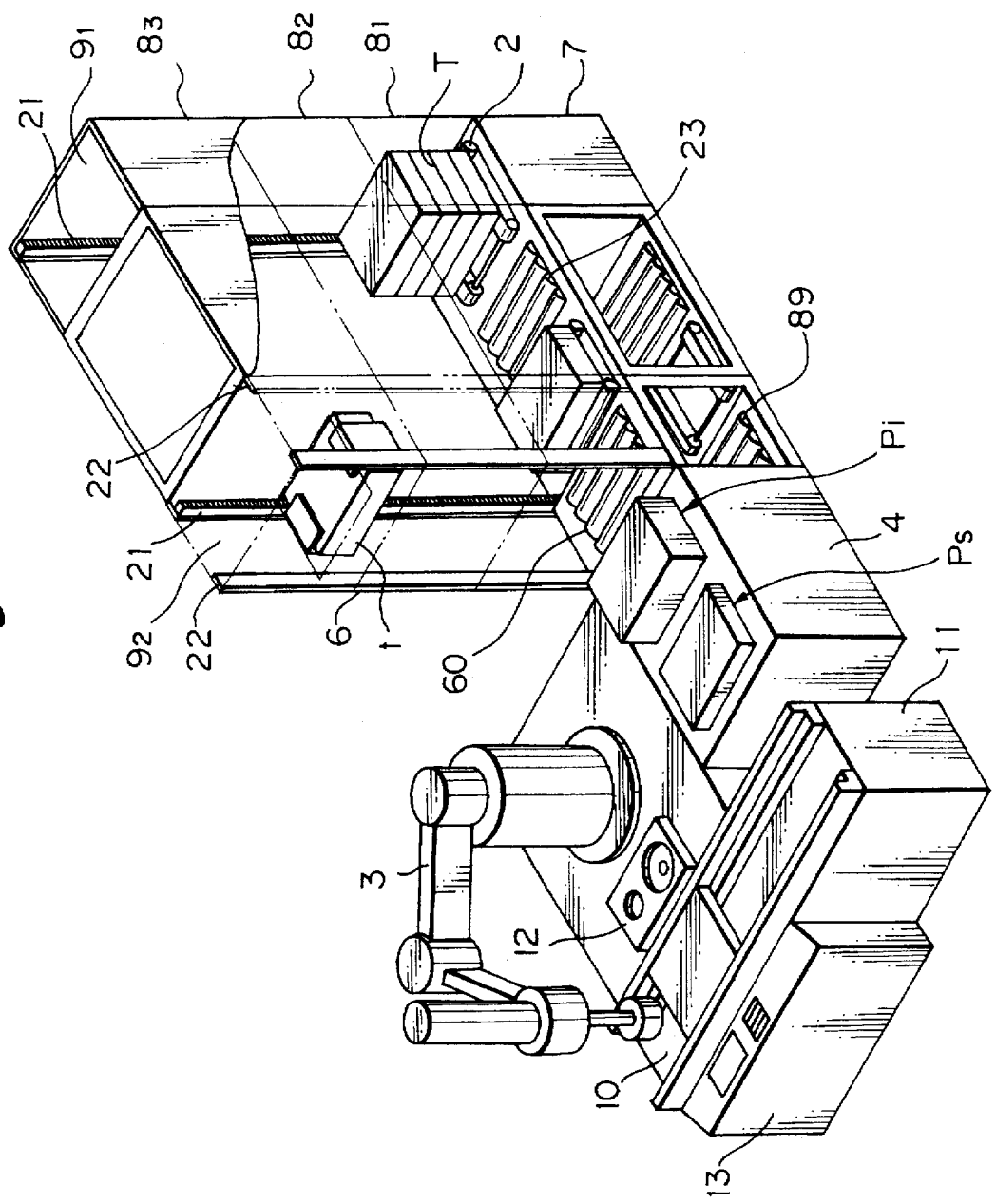
FIG. 2 is a perspective view of a parts supply system embodying the present invention.

FIG. 2 shows a parts supply system embodying the present invention. The system will be described with reference also made to FIG. 1. As shown, the system is generally made up of a base module 7 including the discharge mechanism J, a plurality of (three in the embodiment) stock modules $8_1$, $8_2$ and $8_3$ stacked on the base module 7 and corresponding to the storage S and conveying means H, and a tray changer 4 corresponding to the circulation mechanism TC. The system is controlled by a control device, not shown, to automatically supply parts to a robot 3 which will mount them to a work 12. The stock modules $8_1$–$8_3$ are provided with the same configuration. To facilitate an understanding of the embodiment, assume that a plurality of trays each storing parts of the same kind are respectively received in the stock modules $8_1$–$8_3$. Hence, the embodiment automatically supplies three different kinds of parts to the robot 3, although four or more kinds of parts may be supplied if additional stock modules 8 are stacked on the base module 7.

The stock modules $8_1$–$8_3$ each has spaces $9_1$ and $9_2$ at the right and the left, respectively, as viewed in the figure. The right space $9_1$ is an inlet lifter space in which an inlet lifter 2 is movable up and down for transporting a tray group T. A pinion, not shown, is mounted on the inlet lifter 2 and held in mesh with a rack 21. When the pinion is driven, the inlet lifter 2 is moved upward or downward in the inlet lifter space 91 along guide rails 22. The inlet lifter 2 receives from the outside a tray group T, i.e., a stack of trays t each storing parts of particular kind at the height where the bottom stock module $8_1$ is located. The inlet lifter 2 pushes the tray group T into the bottom stock module $8_1$ at the above-mentioned height or pushes it into the top stock module $8_3$ or the intermediate stock module $8_2$ after rising to the height thereof. The stock modules $8_1$–$8_3$ are each provided with a roller conveyor 23. The trays t storing parts of the same kind are received by the roller conveyor 23 of the particular stock module 8. When a separating mechanism, not shown, located in front of the roller conveyor 23 is not occupied or when all the trays t of the preceding tray group T are driven into the left space $9_2$, the roller conveyor 23 conveys the trays t to the position where the separating mechanism is located.

Assume that the control device commands the system to supply parts stored in the trays t existing in, for example, the top stock module $8_3$. The separating mechanism of the module $8_3$ separates the top tray t from the other trays and pushes it toward an outlet lifter. Corresponding to part of the conveying means H, the outlet lifter 1 moves downward in the left space, or outlet lifter space, $9_2$ while suspending the tray t pushed out from the stock module $8_3$ and then releases it on a roller conveyor 60. The roller conveyor 60 is provided on the top of the tray changer 4 and forms part of the conveying means H. Since the roller conveyor 60 of the tray changer 60 is located at a position corresponding to the outlet lifter space $9_2$, the base module 7 has a small area, as viewed in a plan view, than the stock modules $8_1$–$8_3$, as will be described later specifically.

The tray changer 4 loads the tray t laid on the roller conveyor 60 onto a tray carrier, not shown, at a tray loading position Pi and transports, in a cycle to follow, the tray t to a parts supply position Ps where the robot 3 can pick up parts from the tray t. The robot 3 picks up one of the parts from the tray t with an arm thereof, mounts it to a work positioned on an assembly table 12, puts the work on a platen 10, and then causes a conveyor 11 to convey the platen to a predetermined location, e.g., the next assembly system or a warehouse. The reference numeral 13 designates a control device, or cell controller as will be described, for controlling the assembly system.

The tray carrier supplied one part to the robot 3 is conveyed from the parts supply position Ps to a waiting position Pw. FIG. 1, while carrying the tray t thereon. Then, in the next moving cycle, the tray carrier is shifted to a tray discharge position Po, FIG. 1, just below the tray loading position Pi. When the parts stored in the same tray t are again needed by the robot 3, the tray carrier is raised to the tray loading position Pi in the next moving cycle and then conveyed to the parts supply position Ps in another moving cycle. When all the parts of the tray t have been used by the robot 3 or when the parts of the tray t are not needed any more, the tray t is transferred from the tray carrier to a roller conveyor 89 also included in the tray changer 4. Let the empty tray or needless tray be referred to as an idle tray hereinafter.

A stacking mechanism is included in the base module 7 and located at the side where the module 7 adjoins the roller conveyor 89. The stacking mechanism stacks the idle trays sequentially brought thereto by the roller conveyor 89. When the stack of idle trays exceeds a predetermined height, the stack is shifted from the stacking mechanism to a stock portion defined on a roller conveyor and then driven out of the base module 7 at a suitable time.

Assume that the process command from the control device designates parts, the designation is implemented by a parts code. Then, it is necessary to confirm the parts code assigned to the parts stored in a tray of interest. For example, when one of the parts which the robot should pick up and the parts stored in a tray brought to the parts supply position Ps are different from each other, the robot 3 will pick up the part with an unexpected hand or at an unexpected position. This damages the robot itself or the parts stored in the tray. To eliminate this problem, the parts on the tray carrier must be confirmed at any of the tray loading position Pi, parts supply position Ps and tray discharge position Po. It is most preferable to identify the parts themselves stored in the tray t by some implementation. However, causing a robot to identify the shape and size of parts with a visual implement is difficult or results in a prohibitive cost, if not possible. A mark representing a parts code assigned to or matched to the parts may be displayed on the portion of the tray t which can be observed at the outside of the tray t. Then, the mark will be read to identify the parts stored in the tray t. However, this is not practicable unless each tray carrier is provided with a mark sensor, since the tray t is loaded on the tray carrier and since the tray carrier moves in the tray changer 4. Providing each tray carrier with a mark sensor complicates the construction of the tray carrier. Moreover, this kind of scheme needs electric connection to the mark sensor of the tray carrier which is movable, complicating the structure of the tray changer to a critical degree. Hence, such a scheme is not practicable in respect of cost and reliability.

Figure 3:
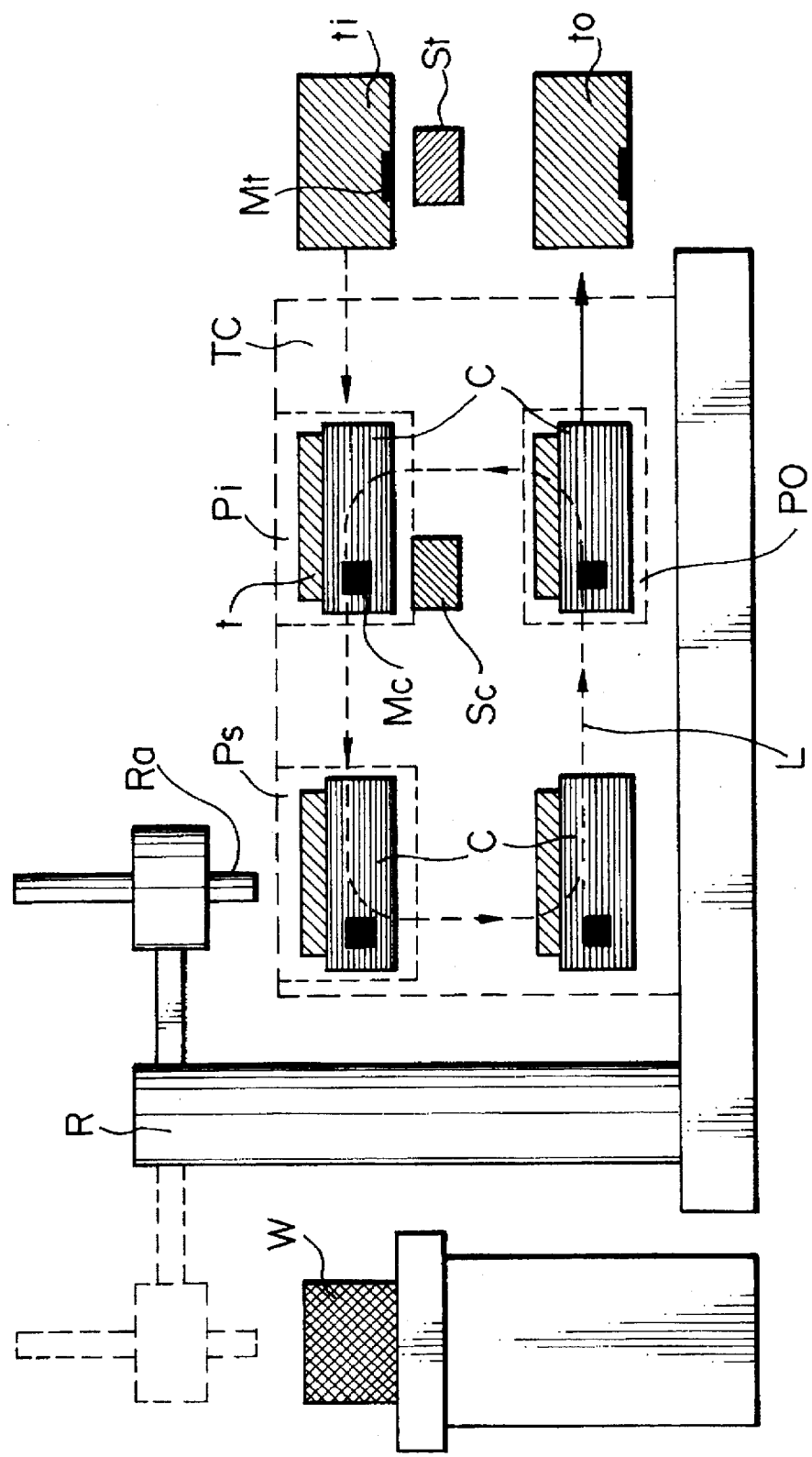
FIG. 3 is a view similar to FIG. 1 and useful for understanding a tray mark and a carrier mark.

In light of the above, as shown in FIG. 3, the illustrative embodiment displays a tray mark Mt representing the kind of parts stored in a tray in the portion of the tray which can be read at the outside. In addition, the embodiment displays a particular carrier mark Mc on each tray carrier C at a position which can also be read at the outside. There are provided in the embodiment a tray reading device connected to a tray sensor St, a carrier reading device connected to a carrier sensor Sc, and table means. As the tray sensor St senses the tray mark Mt of a tray ti carried on a carrier C, the tray reading device outputs a parts code representing the kind of parts stored in the tray ti. The carrier sensor Sc is located at the tray loading position Pi and senses the carrier mark Mc provided on a tray carrier C to be loaded with the tray ti. On receiving the output of the carrier sensor Sc, the carrier reading device outputs a carrier code identifying the tray carrier C. The table means lists carrier codes and parts codes in pairs. When a command designating a particular parts code is received from the control device or host, the embodiment transforms the parts code to a corresponding carrier code by referencing the table means and executes the command on the basis of the carrier code. A control processor built in the parts supply system may execute such a procedure.

To better understand the embodiment, assume that each tray t stores parts of the same kind, and that the tray mark Mt of the tray t represents a parts code Dp given to the parts.

The tray code sensor St, adjoining the tray loading position Pi, senses the tray mark Mt of a tray t and sends the resulting mark data to the control processor. In response, the control processor transforms the mark data to a parts code Dp. The tray code sensor St and the function of converting the output of the sensor St to a parts code Dp and available with the control processor constitute the tray reading device. The carrier code sensor Sc, located at the tray loading position Pi, senses a carrier mark Mc provided on, for example, the side of a tray carrier C. The carrier mark Mc is transformed to a carrier code Dc. The carrier code sensor Sc and the function of transforming the output of the sensor Sc to a carrier code Dc and also available with the control processor constitute the carrier reading device. When four tray carriers are used, as stated above, they can be distinguished from each other if use if made of, for example, four carrier marks Mc each being implemented as a particular black/white pair.

As stated above, with the parts code Dt produced from the tray mark Mt of the tray sensed at the tray loading position Pi and the carrier code Dc produced from the carrier mark Mc of the tray carrier C, it is possible to determine the correspondence of the tray carrier C and the tray t carried thereon on the basis of the carrier code Dc and parts code Dt, as shown in FIG. 4B. State another way, the table of FIG. 4B indicates the relation between the tray carrier C and the kind of parts existing thereon. When it is desired to identify or confirm the kind of parts stored in a tray at the parts supply position Ps or the tray discharge position Po, a code sensor will also be located at the position Ps or Po although not shown in the figure.

FIG. 4C shows a modification of the above-stated table means. As shown, the table means is implemented as a shift register in which parts codes Dt and carrier codes Dc are sequentially shifted in pairs. Every time a tray carrier C moves from one position to another, e.g., from the tray loading position Pi to the parts supply position Ps, data stored in the shift register are shifted. As a result, the position of a pair of parts code Dt and carrier code Dc, associated with a given tray carrier C, on the table corresponds to the actual position of the tray carrier C on the circulation path L at all times. Hence, by reading data out of a fixed position of the table, as shown at the right-hand side of FIG. 4C, it is possible to identify the tray carrier C located at the position on the path L corresponding to the position on the table; e.g., the tray loading position Pi, parts supply position Ps or tray discharge position Po and the parts carried on the carrier C.

The procedure described above is shown in a flowchart in FIG. 4A and executed in response to a command designating parts by a parts code. As shown, whether or not the command designates parts by a part code is determined (step S1). If the answer of the step S1 is positive (Y), a parts code Dp is separated from the command (step S2). Then, the table is referenced with the parts code Dp serving as a key (step S3). If the parts code Dp is absent in the table (N, step S4), an error is reported to the host (step S5) to cause it to unable the parts supply system. On the other hand, if the parts code Dp is present in the table (Y, step S4), the parts code Dp is transformed to a carrier code Dc (step S6). Finally, the command is executed with the carrier code Dc or on the basis of the carrier code Dc, depending on the content of the command (step S7). It is to be noted that the step 7 is indicated by a phantom block since it is not executed in the routine shown in FIG. 4A.

As for the tray mark Mt provided on the tray t, the parts code Dp may be replaced with a particular code assigned to each of trays t1, t2, . . . , tn or a code assigned to each group of parts stored. Such a code will also be transformed to a parts code by use of, for example, a table.

The individual devices constituting the parts supply system will be described hereinafter specifically.

Tray

Figure 5A:
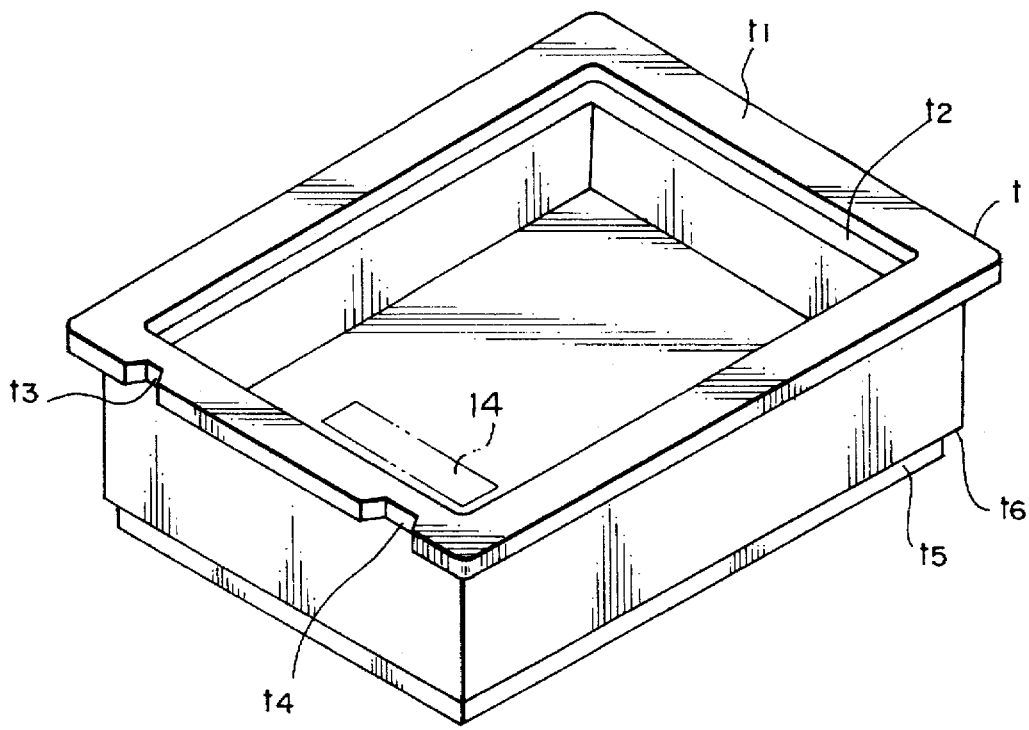
FIGS. 5A and 5B show a tray applicable to the present invention.
Figure 5B:
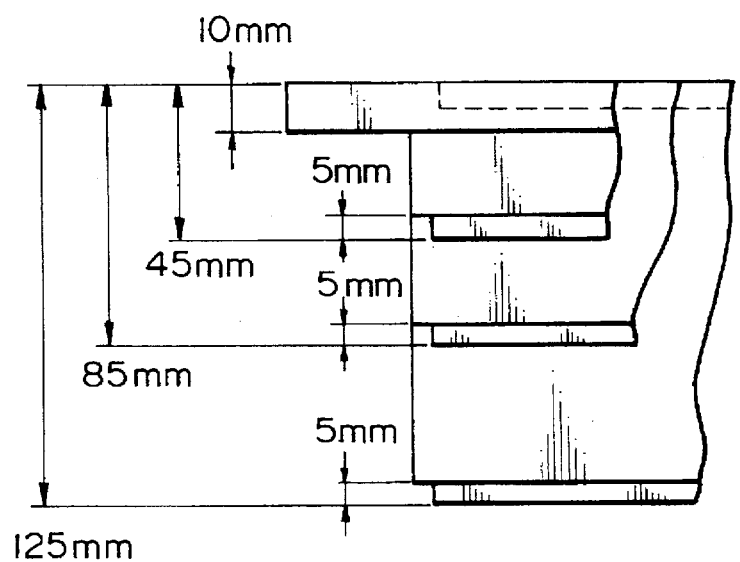

Referring to FIGS. 5A and 5B, the tray t is assumed to store parts of the same kind and positions them such that the robot R can pick them up in the up-and-down direction. How the parts are retained in the tray t will not be described specifically since it depends on the configuration and structure of parts. As shown in FIG. 5A, the tray t is implemented as a box having a flange $t_1$ at the upper edge thereof. A recess $t_2$ is provided inwardly of the flange $t_1$ such that when another tray t is stacked on the tray t, the bottom of the former is received in the recess $t_2$ of the latter by about 5 mm. This prevents the overlying tray t from being displaced relative to the underlying tray t. Notches t3 and t4 are formed in the flange $t_1$, and each flares toward the outside in a trapezoidal shape. A stepped portion $t_6$ is provided on the bottom $t_5$ of the tray t such that it rests on the bottom of the recess $t_2$ of the underlying tray t, as mentioned above.

The tray mark Mt is implemented as a tray mark 14 which is, for example, a label adhered to the bottom of the tray t. For the tray mark, use may be made of a bar code or a dot mark capable of displaying kinds corresponding in number to the kinds of parts. When each tray t stores parts of the same kind, the tray mark should preferably be implemented as a code representing the parts code of the parts.

While all the trays t have the same size as viewed in a plan view, each tray t may be provided with a particular depth, e.g., 45 mm, 85 mm or 125 mm, as shown in FIG. 5B. In the following description, trays t which are 45 mm deep, 85 mm deep and 125 mm deep are assumed and referred to as an S tray, an M tray and an L tray, respectively.

Inlet Lifter

Figure 6:
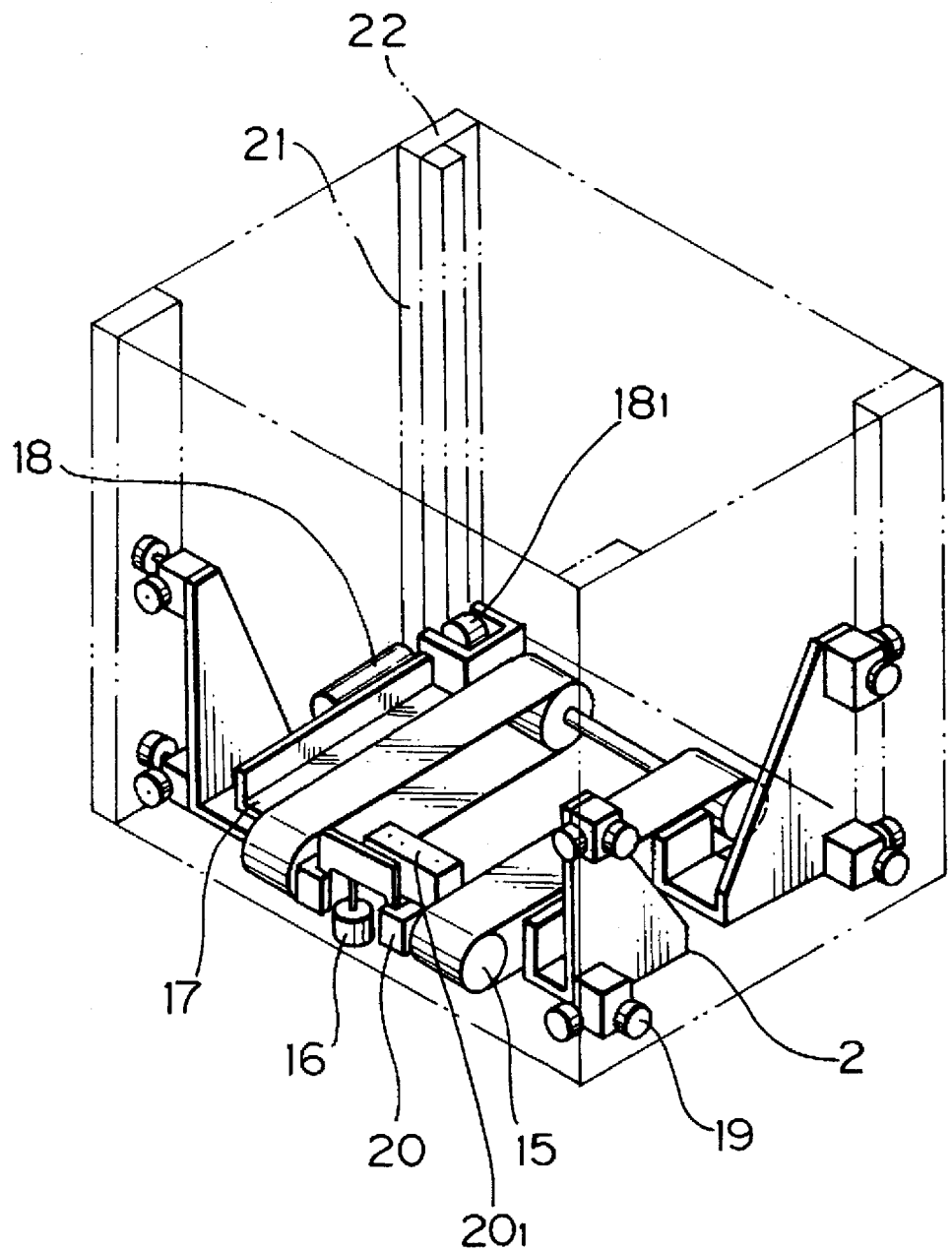
FIG. 6 is a perspective view showing a specific construction of an inlet lifter included in the embodiment.

The inlet lifter 2 is movable up and down in the aligned inlet lifter spaces $9_1$ provided in the stock modules $8_1$–$83$, as stated with reference to FIG. 2. On receiving a tray group T, the inlet lifter 2 rises to a height corresponding to necessary one of the stock modules $8_1$–$8_3$ in the aligned inlet lifter spaces $9_1$ and then pushes the tray group into the module. As shown in FIG. 6, guide rollers 19 are mounted on the inlet lifter 2 and respectively received in guide rails 22 which are indicated by phantom lines in the figure. The guide rails 22 are respectively affixed to the four corners of the inlet lifter space $9_1$ of each stock modules 8. A pinion $18_1$ and a motor 18 are also mounted on the inlet lifter 2. The pinion $18_1$ is held in mesh with a rack 21 provided on at least one of the four guide rails 22 and is driven by the motor 18. When the motor 18 is energized, it causes the inlet lifter 2 to move upward or downward via the pinion $18_1$ and rack 21.

A belt conveyor 15 is provided on the inlet lifter 2 in order to receive a tray group T loaded with parts and push them into the stock modules 8. A photoelectric sensor 20 senses the tray mark 14, FIG. 5A, provided on the bottom of the tray t resting on the belt conveyor 15. A stop 16 defines a position for stopping the tray group T and is collapsible due to the operation of a cylinder or similar drive mechanism. Guide walls 17 restrict the movement of the tray group T in the lateral direction. Assume that an unmanned vehicle transports the tray group T from, for example, an automated warehouse to the parts supply system in response to a command sent to the warehouse. Then, the belt conveyor 15 held in a home position is rotated to receive the tray group T from the vehicle. At this instant, the stop 16 is held in an upright position to position the front end of the incoming tray group T. When the tray group T abuts against the stop 16, a photoelectric sensor $20_1$ adjoining the stop 16 senses it and causes the belt conveyor 15 to stop rotating.

The photoelectric sensor 20, implemented as a plurality of photosensitive elements, reads the tray mark 14 provided on the bottom of the lowermost tray t of the group T positioned by the stop 16 and guide walls 17. In response to the output of the sensor 20, the control processor determined whether or not the parts stored in the tray group T are the designates parts. If the answer of this decision is positive, the motor 18 is energized to rotate the pinion $18_1$ meshing with the rack 21. As a result, the inlet lifter 2 rises and brings the tray group T to the preselected stock module $8_2$ or $8_3$. If the inlet lifter 2 is initially positioned such that the upper surface of the belt conveyor 15 and that of the conveyor 23 of the base module 7 are flush with each other, the lifter 2 can, of course, deliver the tray group T to the stock module $8_1$ without moving upward or downward.

When the inlet lifter 2 reaches the preselected stock module 8, the stop 16 is collapsed. Then, the belt conveyor 20 is again rotated to deliver the tray group T into a buffer 23 (see FIGS. 2 and 7A) of the module 8 implemented as a free flow conveyor.

Stock Module

Figure 7A:
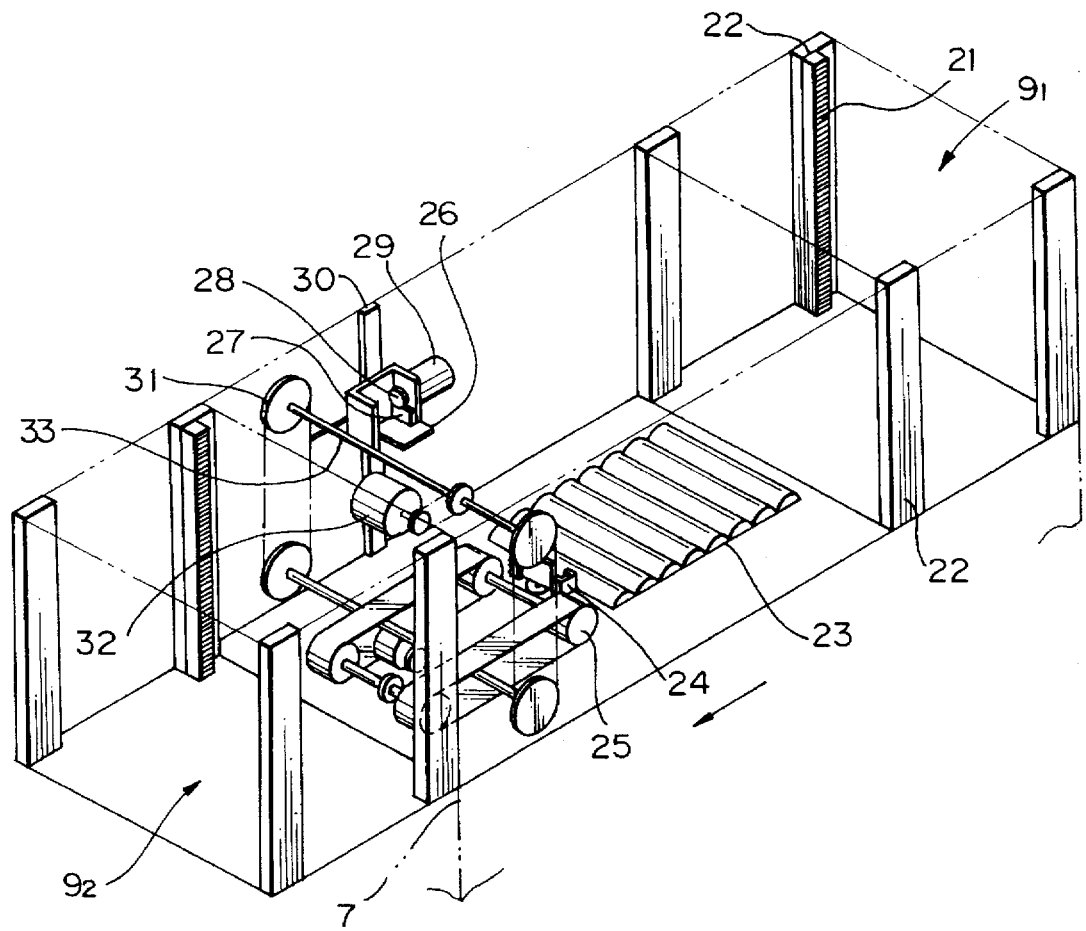
FIGS. 7A and 7B show a specific construction of a stock module also included in the embodiment.

As shown in FIG. 7A, each stock module 8 once stocks the tray group T handed over from the inlet lifter 2, separates the lowermost tray t from the other trays t, and then delivers it to the outlet lifter 6. Since the stock modules $8_1$–$8_3$ are each assigned to a particular kind of parts, all the trays t stocked in each stock module store parts of the same kind.

The four guide rails 22 shown at the right-hand side of FIG. 7A define the inlet lifter space $9_1$, and at least one of them has the rack 21 meshing with the pinion $18_1$ of the inlet lifter 2. A collapsible stop 24 is positioned at the front end of the buffer, or free flow conveyor, 23. When the tray group T is handed over from the inlet lifter 2 to the stock module 8, it advances along the buffer 23 until it abuts against the stop 24.

A separating mechanism is located in front of the buffer 23 and includes a separator in the form of a pawl 26. A sensor, not shown, is positioned just below the pawl 26 for sensing a tray group on the conveyor 25. When the control device sends a command to the system to cause it to feed one of the trays t from the stock module 8 to the robot 3, the sensor determined whether or not a tray group is present on the conveyor 25. If the answer of this decision is negative, the stop 24 is collapsed. Then, the free flow conveyor 23 and the conveyor 25 disposed below the pawl 26 are driven to move the tray group T from the buffer 23 to the separating mechanism. The conveying speed of the conveyor 25 is higher than that of the free flow conveyor 23. Hence, when the leading end of the tray group T reaches the conveyor 25 below the pawl 26, a gap is produced between the tray group T and the preceding tray group. The stop 24 is again raised to enter the gap between the consecutive tray groups. As a result, the tray group T transferred to the separating mechanism and the tray group left on the buffer 23 are separated from each other.

Figure 7B:
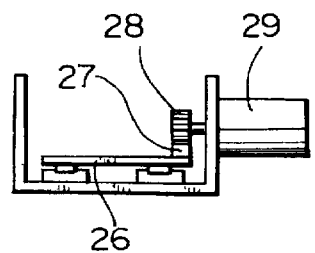

As shown in FIG. 7B, the pawl 26 is moved by a rack 27, a pinion 28 and a rotary actuator 29 in the direction perpendicular to the sheet surface of the figure. The pawl 26 is, therefore, selectively movable to a protruded position where it sustains the flange $t_1$ of a tray, FIG. 5A, from below or to a retracted position where it is spaced apart from the flange $t_1$. Specifically, a right pawl 26 and a left pawl 26 are provided in a pair, and each is movable up and down. A right and a left chain 31 are driven by a motor 32 via a shaft 33. The pawls 26 are respectively affixed to the chains 31. In this condition, when the motor 32 is energized, the two pawls 26 move upward or downward along a guide mechanism 30 while remaining at the same height as each other.

The pawls 26, held at their protruded position, are raised from a height higher than the flange $t_1$ of a single tray, but lower than, when two trays are staked, the flange $t_1$ of the upper tray. As a result, the pawls 26 abut against and raise the flange $t_1$ of the second tray, as counted from the bottom, of the group T located at the separating position. Consequently, the lowermost tray is separated from the overlying trays. For example, assume that the L trays shown in FIGS. 5A and 5B are stacked on the stock module 8. Then, the pawls 26 in the protruded position are raised from a height higher than the upper surface of the flange of the L tray (125 mm), but lower than, when two L trays are stacked, the lower surface of the upper L tray (125+120−10=235 mm).

After the lowermost tray has been separated from the overlying tays and left on the conveyor 25, the conveyor 25 is driven to move it toward the outlet lifter 6. Subsequently, the motor 32 is rotated to lower the pawls 26 to thereby lower the trays sustained by the pawls 26 onto the conveyor 25. Then, the rotary actuator 29 are energized to move the pawls 26 from their protruded position to the retracted position.

Outlet Lifter

Figure 8A:
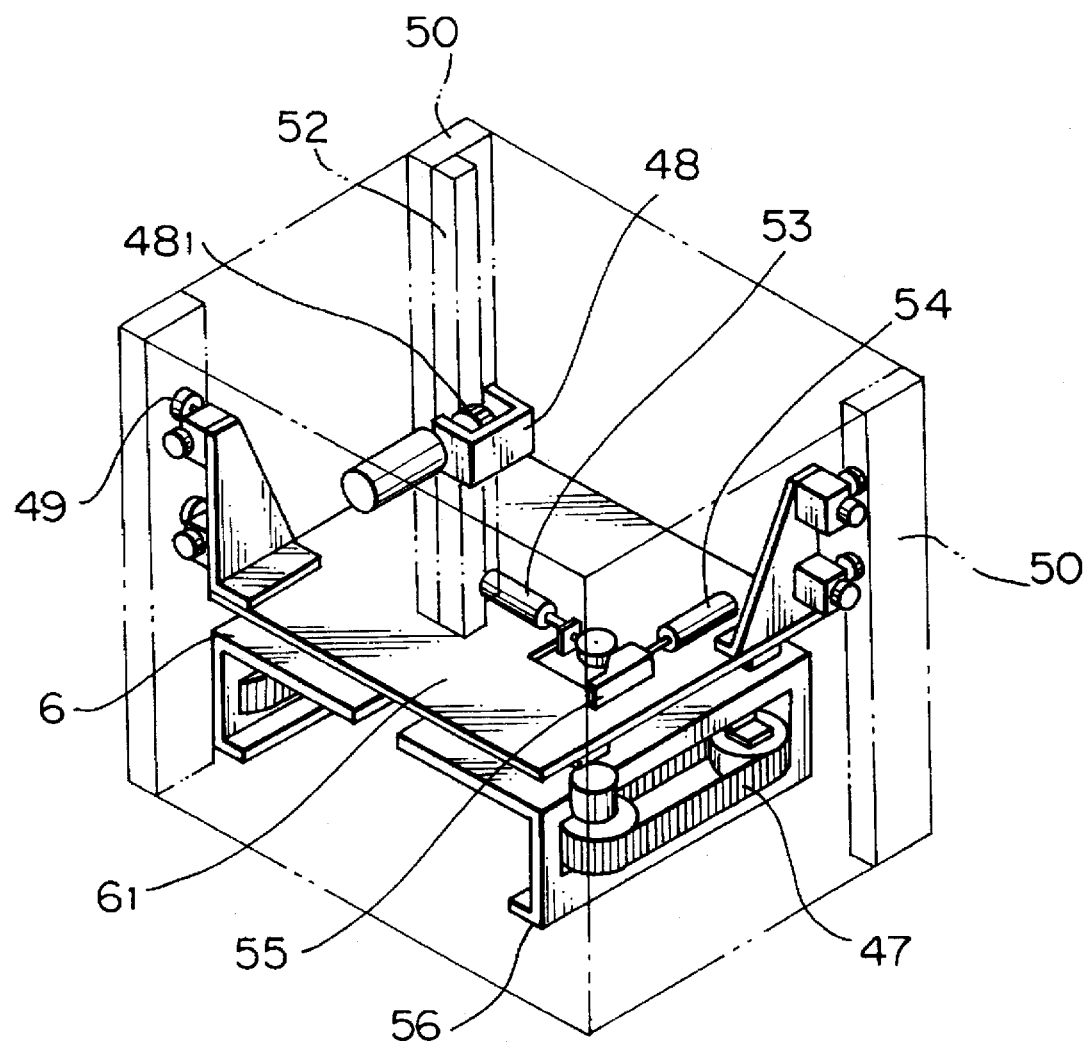
FIGS. 8A–8C show a specific construction of an outlet lifter also included in the embodiment.

As shown in FIG. 8A, the outlet lifter 6 moves in the aligned outlet lifter spaces $9_2$ of the stock modules $8_1$–$8_3$ while holding the tray separated from the other trays by the separating mechanism and lays it on the roller conveyor 60 arranged on the top of the tray changer 4, FIG. 2. The outlet lifter 6, like the inlet lifter 2, has guide rollers 49 at the four corners of a base plate $6_1$. The guide rollers 49 are respectively movable up and down along guide rails 50. A pinion $48_1$ is mounted on the base plate $6_1$ and held in mesh with a rack 52 provided on at least one of the guide rails 50. The base plate $6_1$ is movable upward or downward when the motor 48 is energized. A pair of support members 56 are mounted on the underside of the base plate 61 and face each other. The support members 56 are each bent in the form of a letter U and formed with a hole through the vertical wall thereof. A belt conveyor 47 is mounted on the vertical wall of each support member 56 and protrudes into the inside of "U". A moving mechanism selectively moves the support members 56 to a position where they will be urged against the opposite side walls of the tray t or to a position where they will be released from the tray t.

Figure 8B:
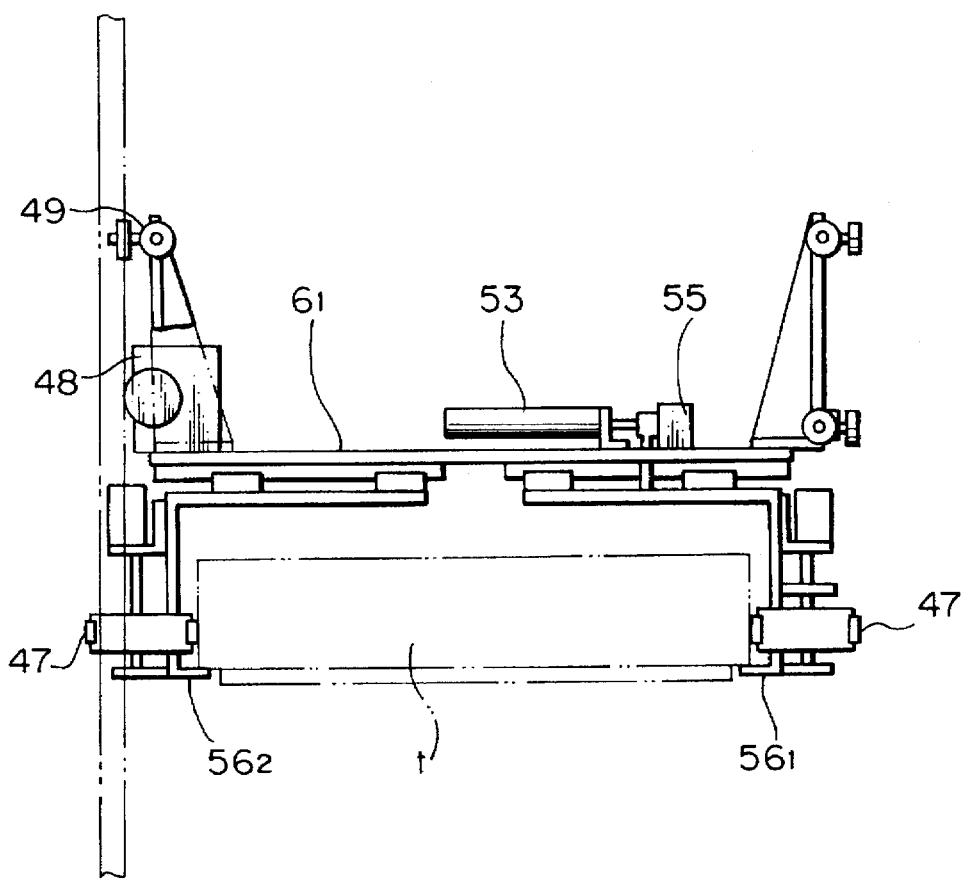
Figure 8C:
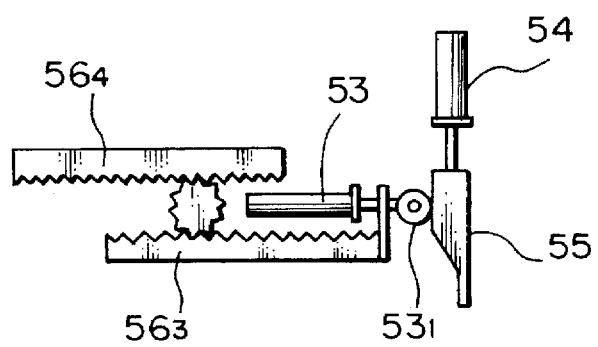

Specifically, as shown in FIGS. 8B and 8C, the moving mechanism has racks $56_3$ and $56_4$ connected to the support members $56_1$ and $56_2$, respectively. When one of the racks $56_3$ and $56_4$ is moved by a gear, the other rack moves in the opposite direction. Cylinders 53 and 54 and a cam 55 move one $56_3$ of the racks. The cylinder 54 moves the cam 55 in the up-and-down direction as viewed in FIG. 8C. A roller $53_1$ is mounted on an arm extending from the cylinder 53. The cylinder 53 urges the roller $53_1$ against the cam surface of the cam 55. In the position shown in FIG. 8C, the roller $53_1$ mounted on the arm of the cylinder 53 is pressed by the cam 55 to the left, the rack $56_3$ connected to the cylinder 53 is also positioned at the left-hand side while the other rack $56_4$ is located at the right-hand side. Hence, the support members $56_1$ and $56_2$ are positioned close to each other, so that their conveyors 47 will be pressed against a tray. When the cylinder 54 is controlled to raise the cam 55 in the FIG. 8C, the roller $53_1$ and, therefore, the rack $56_3$ is moved to the right. At the same time, the other rack $56_4$ is moved to the left by the gear intervening between the racks $56_3$ and $56_4$. As a result, the support members $56_1$ and $56_2$ are moved away from each other, so that a tray will be released.

Initially, the outlet lifter 6 is held in alignment with the uppermost stock module $8_3$ with the support members $56_1$ and $56_2$ thereof positioned close to each other. When the control processor sends a command commanding the supply of a tray, the motor 48 is rotated to lower the outlet lifter 6 until a switch, not shown, determines that the upper end of the support members 56 and that of the belt conveyor 25, FIG. 7A, of the stock module 8 stocking the designated tray t have become flush with each other. Subsequently, the belt conveyor 25 of the stock module 8 is driven to push the separated tray t out of the module 8. When the belt conveyors 47 are driven while being urged toward each other, the tray t being forced out from the stock module 8 is guided and gripped by the support members $56_1$ and $56_2$, as indicated by a phantom line in FIG. 8B. The outlet lifter 6, now carrying the tray t therewith, is lowered to a level close to the roller conveyor 60, FIG. 2, provided on the top of the tray changer 4. Subsequently, the cylinder 54 moves the support members $56_1$ and $56_2$ away from each other. As a result, the tray t is released from the support members $56_1$ and $56_2$ and laid on the roller conveyor 60. Then, the outlet lifter 6 is returned to the initial position where it aligns with the uppermost stock module $8_3$, and the cylinder 54 is controlled to move the support members $56_1$ and $56_2$ toward each other.

Tray Changer

Figure 9:
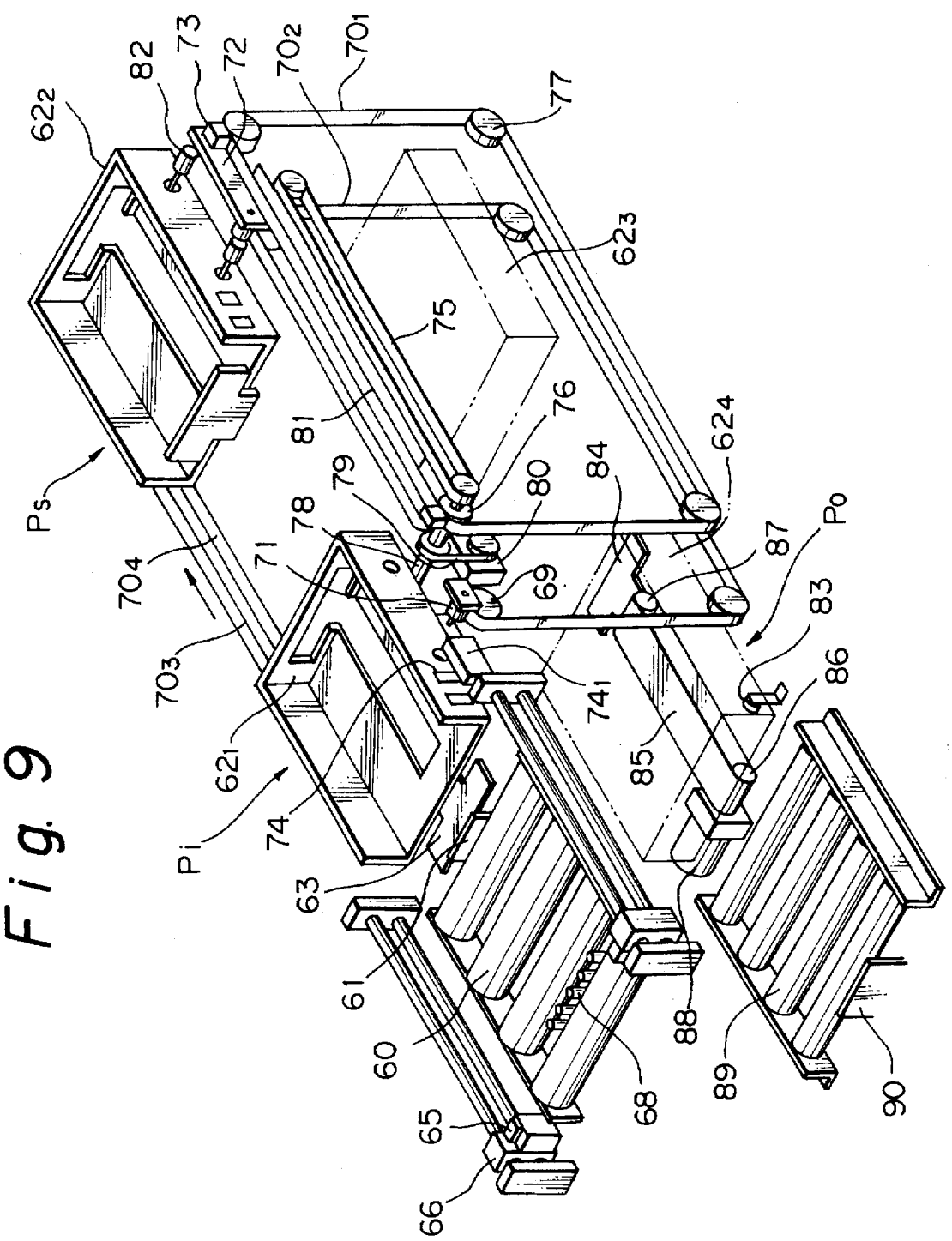
FIG. 9 is a perspective view showing a specific construction of a tray changer also included in the embodiment.

As shown in FIG. 9, the tray changer generally corresponds to the circulation mechanism TC described with reference to FIG. 1. It is to be noted that FIG. 9 is a perspective view as seen in the opposite direction to FIGS. 2 and 6–8C for the illustrative purpose, i.e., a tray from the outlet lifter 6 moves from the left to the right in FIG. 9. As shown, the tray changer has the roller conveyor 60 for receiving a tray conveyed from the stock module $8_2$ or $8_3$ or pushed out from the stock module $8_1$. A stop 61 defines a position for stopping the tray. A pawl 65 is movable up and down and forces the tray into the tray changer. A receiving mechanism includes cylinders 66 and 64, and a photoelectric sensor 68 responsive to the kind of the tray. Whether or not a tray is present in the receiving mechanism is determined on the basis of information stored in the control processor. If no trays are present in the receiving mechanism, a tray is allowed into the mechanism.

When the roller conveyor 60 is driven, the tray t conveyed from the stock module $8_2$ or $8_3$ by the outlet lifter 6 or pushed out from the stock module $8_1$ in the horizontal direction is conveyed by the conveyor 60 toward the stop 61. When the tray t abuts against the stop 61, sensing means, not shown, causes the roller conveyor 60 to stop moving. As a result, the tray t is brought to a stop at the preselected position. In this position, the sensor 68 senses the tray mark 14, FIG. 5A, provided on the bottom of the tray t. The sensor 68 is positioned slightly lower than the conveying surface of the roller conveyor 60. In the illustrative embodiment, the sensor 68 reads the tray mark 14 via optical fibers; the tips of the fibers are shown as being positioned between the rollers of the conveyor 60. The optical fibers terminate at a photoelectric transducer, not shown.

The output of the sensor 68 representing the tray mark 14 is sent to the control processor, transformed to a parts code, and then written to a work memory. When a carrier code representing a tray carrier loaded with the tray is produced, the parts code is written to the parts code area of the table means, FIG. 4B or 4C, while being matched to the carrier code. By comparing the parts code with a parts code of parts requested by the control processor, it is possible to determine whether or not the tray stores necessary parts.

Circulation Mechanism for Tray Carrier

In the tray changer, tray carriers $62_1$, $62_2$, $62_3$ and $62_4$, each carrying a tray, are sequentially moved along the circulation path L, FIG. 1, from the tray loading position Pi to the same via the parts supply position Ps, waiting position Pw, and tray discharge position Po while remaining in a horizontal position. To implement such circulation, a pair of drive belts $70_1$ and $70_2$ are located at one side of the path L and deviated from each other in the horizontal direction. The belts $70_1$ and $70_2$ are identical in configuration with the path L in their running direction. Another pair of drive belts $70_3$ and $70_4$ are located at the other side of the path L and identical with the belts $70_1$ and $70_2$ as to the configuration and the connection to the tray carriers 62. Let the following description concentrate on the drive belts 701 and 702 and tray carriers 62.

Figure 10A:
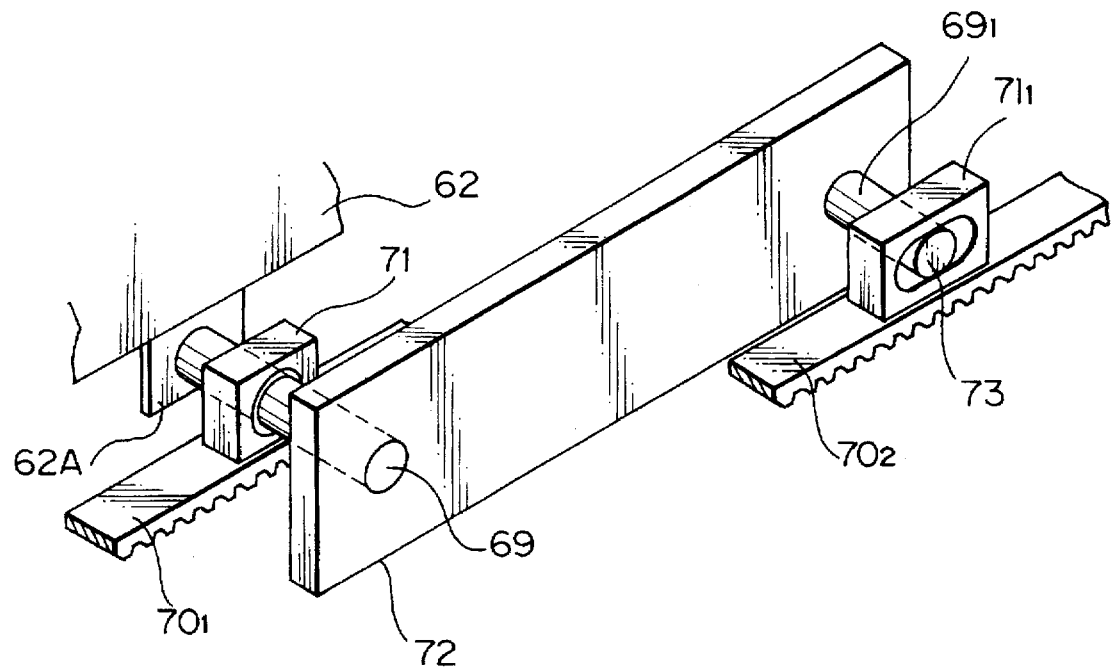
FIGS. 10A and 10B are fragmentary views of the tray changer.

As shown in FIG. 10A in an enlarged scale, a shaft 69 is affixed to a lug 62A extending from the bottom of the tray carrier 62. A bearing 71 is affixed to one belt $70_1$. The shaft 69 is passed through the bearing 71 and affixed to one end of a link plate 72. A shaft $69_1$ is studded on the other end of the link plate 72 and passed through a bearing $71_1$ affixed to the other belt $70_2$. The belts $70_1$ and $70_2$ are deviated from each other in the horizontal direction by a distance corresponding to the distance between the shafts 69 and $69_1$. Hence, when the belts $70_1$ and $70_2$, as well as the belts $70_3$ and $70_4$, are driven at the same speed, the tray carriers 62 are circulated along the path L while remaining in a horizontal position.

As shown in FIG. 9, the belts $70_1$–$70_4$ are driven by a drive mechanism including a motor 80 having a built-in braking mechanism. The motor 80 rotates a drive shaft 78 via a belt 79. Affixed to the belt 79 are four pulleys, i.e., a pulley 76 for driving the belt $70_1$, a pulley (not visible) for driving the drive belt $70_3$, a pulley $76_1$ and a pulley (not visible) for driving the belts $70_2$ and $70_4$, respectively. The pulley $76_1$ drives via a belt 75 a pulley for driving the belt $70_2$ and having the same diameter as the pulley $76_1$. Hence, when the motor 80 is rotated, the four belts $70_1$–$70_4$ are rotated at the same speed as each other. Guides 81 located at opposite sides of the path L guide the belts $70_1$–$70_4$ to allow them to remain horizontal. In this configuration, the link plate 72 is circulated along the path L while remaining in a horizontal position. Hence, the tray carriers 62 supported by the link plate 72 via the shaft 69 are also sequentially passed through the tray loading position Pi, parts supply position Ps and tray discharge position Po respectively represented by trays $62_1$, $62_2$, $62_3$ and $62_4$, while remaining in a horizontal position.

In the event when the tray located at the receiving mechanism is transferred to a tray carrier of the tray changer in order to supply parts thereof to the robot 3, the control processor determined whether or not the tray carrier $62_1$ facing the roller conveyor 60 at the tray loading position Pi is idle. If the result of this decision is positive or when the control processor receives a signal indicating that the tray carrier $62_1$ discharged the idle tray at the tray discharge position Po has reached the tray loading position Pi, the carrier $62_1$ is stopped at the position Pi. At the position Pi, a carrier mark 74, provided on the side of the tray carrier 62 in the embodiment, is read by a photoelectric sensor $74_1$. The carrier mark 74 should only distinguish the tray carriers 62 existing in the tray changer. Hence, when only four tray carriers are present in the tray carrier, as in the embodiment, combining a white mark and a black mark will suffice. Since the carrier mark 74 is simple, the sensor $74_1$ should only distinguish two kinds of indications as to the two marks. This promotes the use of a miniature and simple sensor and, in addition, reduces the number of leads to be connected to the sensor for thereby facilitating the installation of the sensor in the tray changer. The output of the sensor $74_1$ is sent to the control processor and transformed to a carrier code thereby. The carrier code is written to the table means, FIG. 4B or 4C, together with and in correspondence to the parts code once stored in the work memory.

Figure 10B:
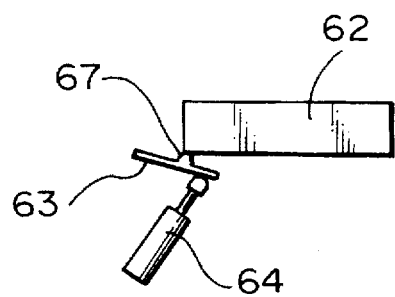

As shown in FIG. 10B, to transfer the tray from the roller conveyor 60 to the tray carrier $62_1$, a door 63 is rotatably mounted on the end of the tray carrier by a shaft 67 and forced by the cylinder 64 to open. At the same time, the previously mentioned stop 61 is collapsed. Subsequently, the right and left pawls 65 are raised. When the pawls 65 reach the height where they can contact the rear end of the tray, as determined by suitable sensing means, the cylinder 66 move the pawls 65 toward the tray carrier $62_1$ at high speed. As a result, the pawls 65 force the tray on the roller conveyor 60 onto the tray carrier $62_1$. The pawls 65 and cylinder 66 are used to transfer the tray to the tray carrier since it is difficult to increase the tray conveying speed, depending on the kind of the roller conveyor 60. If desired, the roller conveyor 60 may be driven to help the pawls 65 and cylinder 66 move the tray. As soon as the tray enters the tray carrier $62_1$, the door 63 is closed by a spring and pushes the tray to a predetermined position on the carrier 621 in cooperation with the cylinder 66. Thereafter, the cylinder 66 is returned to the original position shown in the figure while, at the same time, the pawls 65 are lowered.

After the tray has been laid on the tray carrier 62, it is positioned thereon. A positioning cylinder 82 is located at two positions on one side of the tray changer, and each carries a tapered piece on the free end thereof. The tapered pieces of the cylinders 82 are respectively inserted into the notches $t_3$ and $t_4$ of the tray carrier 62, FIG. 5A, via holes formed through the carrier 62, thereby positioning the tray in the direction of conveyance. Preferably, such a cylinder 82 should also be provided at two positions on the other side of the tray changer and driven at the same time as the above-mentioned cylinders 82, so that the center line of the tray may coincide with that of the tray carrier 62.

The tray carrier 621, carrying the tray t therewith, is moved by the circulation mechanism to the parts supply position Ps (represented by the tray $62_2$) while maintaining the tray t horizontal. On the arrival of the tray carrier $62_1$ at the position Ps, the control processor shifts the pair of parts code and carrier code of the table, shown in FIG. 4C and implemented by a shift register, from a position corresponding to the position Pi to a position corresponding to the position Ps. By referencing the table, the control processor transforms the carrier code stored in the position corresponding to the position Ps to the parts code of the parts loaded on the tray carrier 621. Then, the control processor determines whether or not the parts code is identical with a parts code designated by, for example, a parts supply command received from the host. If the answer of this decision is positive, the control processor allows the robot 3 to pick up one of the parts in the expected manner. If otherwise, the control processor inhibits the robot 3 from picking it up while executing error processing, e.g., producing an alarm.

When a plurality of parts stored in the tray t should be continuously mounted to the work W, FIG. 1, the tray carrier 621 will be held in the parts supply position Ps until all of them have been mounted, as stated earlier.

After the robot 3 has fully dealt with the tray carrier $62_1$ at the parts supply position Ps, the tray changer is shifted to move the tray carrier $62_1$ to the next position represented by the tray carrier $62_3$. As a result, the following tray carrier $62_2$ is brought to the position Ps and then dealt with by the robot 3 in the same manner as the tray carrier $62_1$. After one or more of the parts have been fully picked up by the robot 3, the tray changer is again shifted to move the tray carrier $62_1$ to the tray discharge position Po. If parts are still left in the tray carrier $62_1$ arrived at the position Po, the carrier $62_1$ will be again conveyed to the position Ps via the position Pi by the successive shifts of the tray changer.

As the robot 3 sequentially picks up parts from the tray t at the parts supply position Ps, the tray t is emptied. The order in which the robot 3 picks up parts from positions defined in the tray t is preselected on a position coordinates table. When the robot 3 picks up one part from the last position defined in the tray t, a last part signal is generate to indicated that the tray t is empty. While the last part signal designates the empty tray with a parts code, the parts code may be converted to a carrier code and then written to the memory of the control processor, if desired. The robot 3, picked up the part from the last position of the tray t, sends and end-of-picking signal to the control processor. In response to the last part signal and end-of-picking signal, the control processor executes a procedure for driving the empty or idle tray out of the tray changer 4, as follows.

Assume that the tray carrier $62_1$, carrying the idle tray t therewith, is conveyed from the parts supply position Ps to the tray discharge position Po. Then, the control processor identifies the tray carrier $62_1$ (represented by $62_4$ in FIG. 9) arrived at the position Po on the basis of the parts code and carrier code which are stored in the position of the table or shift register, FIG. 4C, corresponding to the position Po. When the table is not implemented as a shift register, a sensor for reading the carrier mark of the tray carrier $62_1$ may, of course, be located at the position Po in the same manner as the sensor $74_1$. In such a case, a carrier code will be produced from the output of the sensor. On determining that the tray t of the tray carrier 621 is an idle tray to be discharged, the control processor causes the discharging mechanism of the tray changer to bring the idle tray t out of the circulation path and convey it toward the base module 7 (see FIG. 11).

The discharging mechanism has a cam follower 83 abutting against the lower portion of the door 63 of the tray carrier 62 to automatically open it, a belt 85 carrying a pressing piece 84 therewith which is movable to an upright position, a motor 88 for driving the belt 85, a drive pulley 86, a driven pulley 87, a roller conveyor 89, and a stop 90. When the tray carrier 62 with the idle tray t is located at the tray discharge position Po, the cam follower 83 automatically opens the door 63 of the carrier 62. Then, the belt 85 is rotated to cause the pressing piece 84 to rise through a notch formed in the bottom of the carrier 62. The pressing piece 84 continuously moves due to the rotation of the belt 85, pushing the idle tray t at the rear end. As a result, the idle tray t is forced out onto the roller conveyor 89, sliding on the tray carrier 62. At this instant, the door 63 in the open position bridges the gap between the tray carrier 62 and the roller conveyor 89. After the piece 84 has fully forced out the idle tray t, the motor 88 is reversed to return it to the original position shown in FIG. 9. Subsequently, the roller conveyor 89 is driven to move the idle tray t toward the base module 7, FIGS. 2 and 22, until it abuts against the top 90.

Base Module

Figure 11:
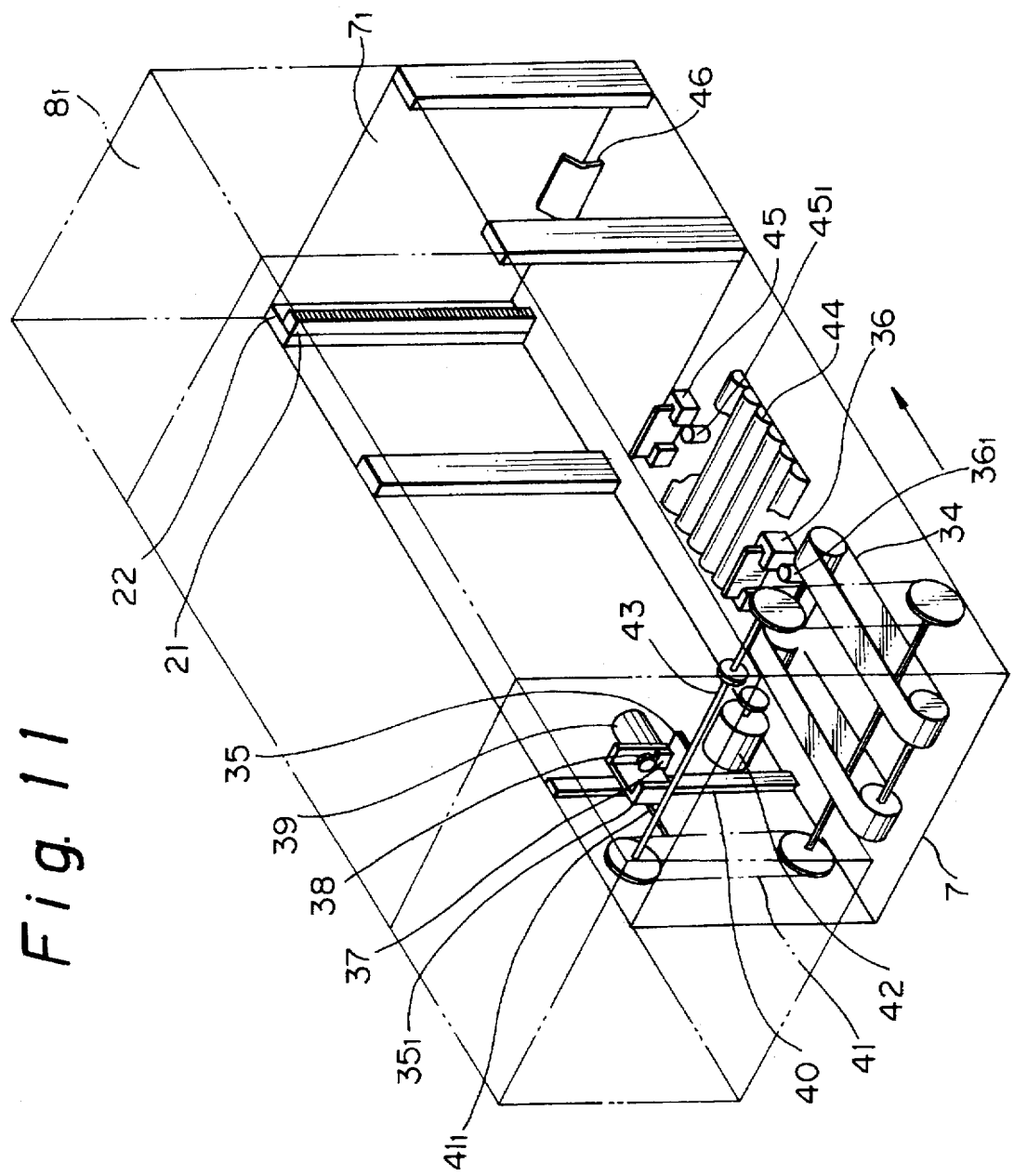
FIG. 11 is a perspective view showing a specific construction of a base module also included in the embodiment.

As shown in FIG. 11, the base module 7 has a stacking mechanism for stacking idle trays sequentially driven out of the tray changer 4. The stacking mechanism has a belt conveyor 34, a pair of pawls 35 disposed above the conveyor 34 in such a manner as to be movable up and down and engageable with opposite sides of the flange $t_1$, FIG. 5A, of the idle tray t, and a stop 36 defining a stacking position. A motor 42 drives a pair of chains 41 via a rotary shaft 43. An arm $41_1$ is affixed to each chain 41 and moves a support piece $35_1$ up and down along a guide mechanism 40. The pawls 35 are respectively provided on such support pieces $35_1$. A rack 37 is affixed to each pawl 35. A pinion 38 is mounted on each support piece $35_1$ and driven by a rotary actuator 39. In this construction, the pawls 35 are selectively movable to a protruded position where they abut against the underside of the flange $t_1$ of the lowermost one of the trays t stacked on the belt conveyor 34 or to a retracted position where they are spaced apart from the flange $t_1$.

Assume that the 125 mm thick L tray, 85 mm thick M tray and 45 mm thick S tray are loaded on the respective tray carriers 62 and are circulated from the tray changer 4 to the belt conveyor 34. While no idle trays are present in the stacking mechanism, the pawls 35 are left open and held at a position where they will not interfere with an idle tray. This height is 130 mm above the surface of the conveyor 34 since the thickness of the L tray is 125 mm. When a sensor $36_1$ senses an idle tray abutted against the stop 36, the pawls 35 are moved to a position lower than the flange $t_1$ of the thinnest tray while being left open. This position is less than 30 mm above the surface of the conveyor 34 since the minimum tray thickness is 45 mm and since the flange $t_1$ is 10 mm thick.

Since the tray height is predetermined on a parts basis, the height of the idle tray to be driven out of the tray changer can be determined beforehand if a table listing tray heights in association with parts codes is prepared or if they are written to the table, FIG. 4B or 4C, in addition to the carrier codes and parts codes. When the pawls 35 are lowered to the particular position, as stated above, the rotary actuators 39 are energized to move the respective pawls 35 to their protruded position. As a result, the pawls 35 sustain the flange $t_1$ of the idle tray. Subsequently, the motor 42 is rotated to raise the pawls 35. When the tray reaches a height 130 mm above the surface of the conveyor 34, the pawls 35 are brought to a stop. In this condition, the tray sustained by the pawls 35 will not interfere even with the 125 mm thick L tray which may be driven out of the tray changer.

When the next idle tray arrives at the stop 36, the pawls 35 are lowered from the position 130 mm above the conveyor surface to a position where a photoelectric switch, not shown, associated with the pawl moving means senses the new idle tray. At such a position, the rotary actuators 39 are driven to move the pawls 35 to their retracted position with the result that the idle tray or trays released from the pawls 35 are stacked on the new idle tray. Subsequently, the pawls 35 in the retracted position are further lowered until their upper surfaces reach a height of less than 30 mm which is lower than the flange $t_1$ of the S tray. Then, the rotary actuators 39 are energized to bring the pawls 35 to the protruded position, thereby causing them to sustain the flange $t_1$ of the new idle tray. Thereafter, the motor 42 is rotated to raise the pawls 35 to a height 130 mm above the conveyor surface.

Assume that an upper limit switch, not shown, turns on when the idle trays sustained by the pawls 35 are lowered onto the new idle tray, i.e., that idle trays are stacked to a predetermined height. Then, the rotary actuators 39 are energized to cause the pawls 35 to retract. As a result, all the idle trays in the stacking mechanism are stacked on the conveyor 34 with the new idle tray located at the bottom. Subsequently, the stop 36 is lowered, and the conveyor 34 is driven to push the stack of idle trays from the conveyor 34 to the following roller conveyor 44. This tray stack is stocked on the roller conveyor 44. The pawls 35, released the stack of idle trays on the conveyor 34, are raised to the stand-by position which is 130 mm above the surface of the conveyor 34.

The idle tray stack stocked on the roller conveyor 44 is moved forward by another idle tray stack when the latter is forced out of the stacking mechanism in the same manner. If the idle tray stack should only be discharged to the outside of the system at the same height as the roller conveyor 44, it will suffice to extend the conveyor 44 to the neighborhood of the right end of the base module 7. However, in the illustrative embodiment, the idle tray stack is discharged at, for example, the tray inlet position of the lowermost stock module $8_1$, FIG. 2. For this purpose, an inlet lifter space $7_1$ is also formed in the base module 7 in alignment with the inlet lifter spaces $9_1$ of the stock modules $8_1$–$8_3$. A guide rail and a rack corresponding to those of the stock modules $8_1$–$8_3$ are provided in the space $7_1$. The inlet lifter 2, FIG. 6, is movable up and down throughout the aligned spaces $9_1$ and $7_1$.

When the idle tray stack is forced out of the stacking mechanism by the following idle tray stack until it abuts against a stop 45, a sensor 45₁ senses it. The inlet lifter 2 is lowered until a sensor, not shown, senses a condition wherein the upper surface of the belt conveyor 15 of the lifter 2 is flush with the upper surface of the conveyor 44. Subsequently, the stop 45 is lowered while the conveyor 44 and the conveyor 15 of the inlet lifter 2 are rotated. As a result, the idle tray stack is transferred from the conveyor 44 to the inlet lifter 2. At this instant, the stop of the inlet lifter 2 is, of course, so positioned as not to obstruct the transfer of the idle tray stack. When the conveyor 15 of the inlet lifter 2 conveys the idle tray stack until it abuts against a stop 46 located at the end of the space $7_1$ of the base module 7, a sensor, not shown senses it. Then, the conveyors 44 and 15 are caused to stop rotating. Thereafter, the inlet lifter 2 raises the idle tray stack to a height where the stock module $8_1$, for example, is located. Then, the conveyor 15 is again rotated to transfer the idle tray stack from the lifter 2 to an unmanned vehicle. When a sensor mounted on the vehicle senses the entry of the idle tray stack, the conveyor 15 stops rotating on the basis of a signal sent from the vehicle. At the same time, when a sensor, not shown, mounted on the lifter 2 stops sensing the idle tray stack due to the transfer of the stack to the vehicle, the lifter 2 is returned to the position where the upper surface of the conveyor 15 and that of the conveyor 23 become flush with each other.

Robot

The robot 3, generally constructed as shown in FIG. 2, has an arm for picking up parts from the tray located at the parts supply position Ps in the tray changer 4. The robot 3 has a base at the lower end thereof. The base has an assembly table 12 for mounting the part gripped by fingers to a work, a finger stock removably holding fingers respectively assigned to particular parts, and a table for supplying screws, E-rings and other general purpose fastening parts. The control device 13, including the control processor for controlling the parts supply system and a control device for controlling the robot 3, and a platen (represented by a plate mounted on the conveyor 11) for conveying a work before or after assembly are mounted on the side walls of the robot 3.

How the robot 3 mounts the parts supplied by the parts supply system to a work will be described hereinafter.

When the platen mounted on the conveyor 11 and loaded with a work is brought to a predetermined position, a sensor, not shown, senses it. In response to the output of the sensor, the control device, or cell controller, 13, causes a positioning mechanism, not shown, to position the platen. The robot 3 shifts the arm from the platen to an assembling position with the arm thereof. Subsequently, the robot 3 starts on assembly in response to a program number and a start signal sent from the controller 13. A program designated by the program number describes information necessary for movements by using the data stored in the memory of the control processor, e.g., the coordinates table listing the positions of parts in a tray, the kinds of hands for chucking parts, and the coordinates data for assembly. As for the parts supply position Ps, for example, coordinates representing the positions of parts in a tray are prepared for each kind of parts and stored in the memory of the control processor in the form of a table.

When the cell controller 13 sends a command designating parts to be picked up and implemented as a parts code to the control processors of the parts supply system and robot, the control processor of the parts supply device transforms the parts code to a carrier code by referencing the table. Then, the device control processor causes the device to move a tray carrier loaded with the designated parts to the parts supply position Ps. On the other hand, the control processor of the robot is informed of the arrival of the tray carrier at the position Ps from the device control processor either directly or via the cell controller 13. In response, the robot control processor causes the robot to pick up one of the parts from the tray, while referencing the coordinates table stored in the memory thereof and representing the positions of parts in the tray. Specifically, every time the robot picks up one part from the tray, the robot control processor shifts data of the coordinates table by one so as to replace it with the coordinates data of the next position. This is repeated to sequentially pick up parts from the trays in a predetermined order and mount them to the work.

After the assembly, the robot shifts the work from the assembly table 12 to the platen on the conveyor 11. After the platen has been released by the cell controller, it is conveyed to another assembly system or to a warehouse as a product.

Outline of Parts Supply System Control

Figure 12A:
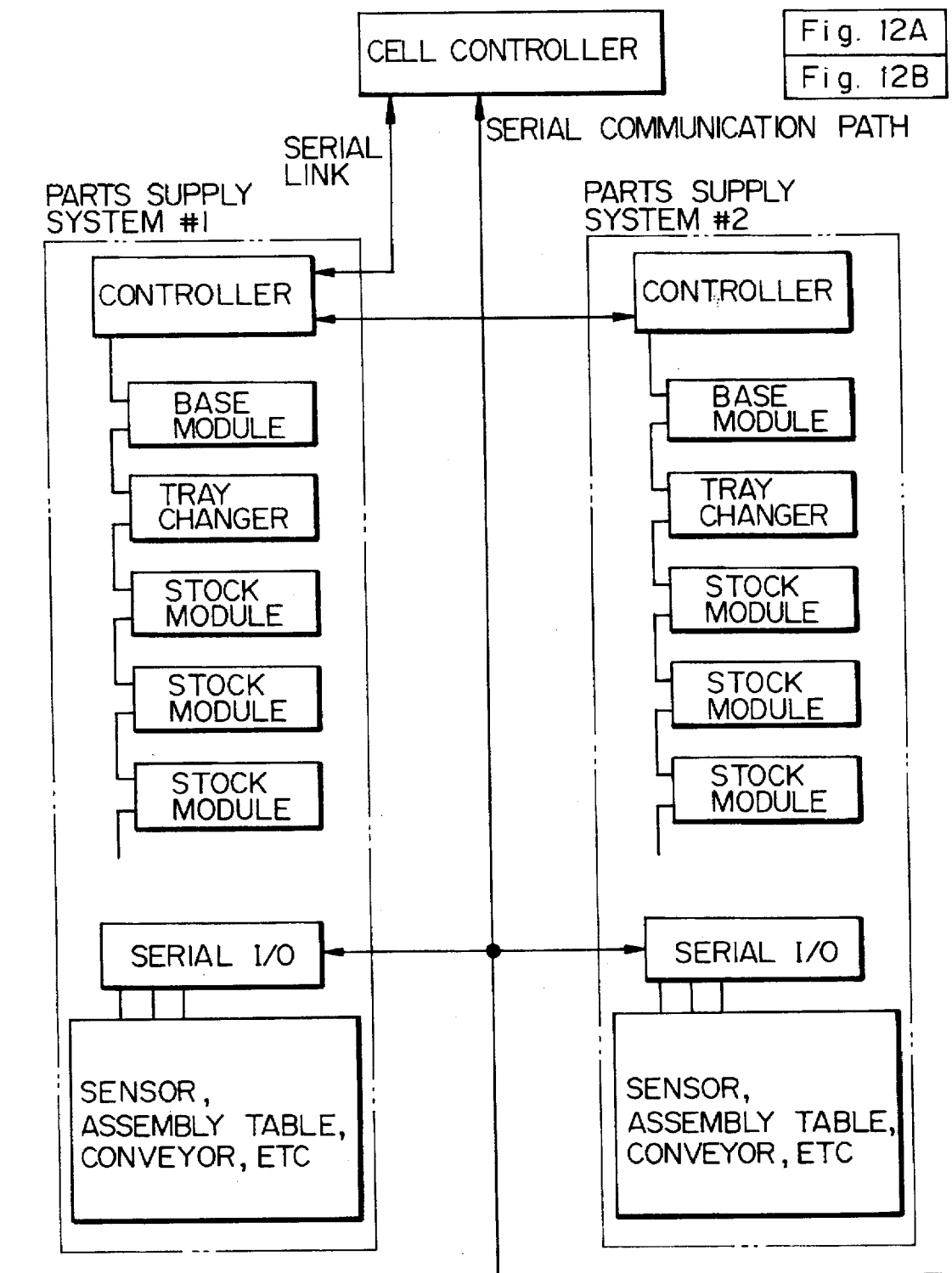
FIG. 12 is a block diagram schematically showing a specific parts supply control system.
Figure 12B:
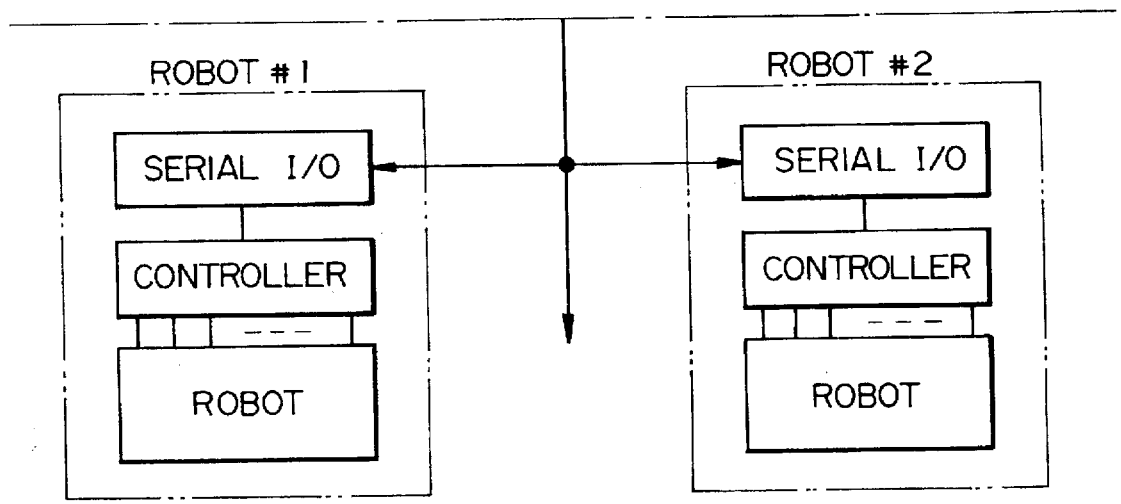

Referring to FIG. 12, the general architecture of a control system for controlling the parts supply system described above is shown. The control system is assumed to control two independent parts supply systems and two robots in parallel with a single cell controller. The two parts supply systems are connected to a single serial link which is connected to the cell controller. A particular address is assigned to each parts supply system. Specifically, when the cell controller accesses one of the parts supply systems, it selects a number assigned to the system. This number is automatically transformed to the address assigned to the system of interest.

The parts supply systems and robots are provided with respective controllers. The cell controller controls the parts supply systems and peripheral equipment by use of a sequence controller while monitoring their operating conditions. Specifically, as for assembly tables, parts lining machines, conveyors and other equipment lacking their own controllers, the cell controller controls them via serial input/output units. As for the parts supply systems and robots having the respective controllers, the cell controller controls only the flow of the overall procedure by sending commands and receiving status signals via the serial link. The operation of each system is controlled by the respective controller. The parts supply systems are each made up of a base module, stock modules, and tray changer, as stated earlier. These modules are each connected to the controller of the system and a serial input/output (I/O) unit by a serial transmission path, as illustrated. Command signals and status signals are interchanged over the serial transmission path.

The constituents described above are designed such that they can be mechanically connected and disconnected with ease, as needed. For example, the number of stock modules changes with a change in the number of kinds of parts to be supplied. In light of this, all the control arrangements between the constituents, including control signal lines and power supply lines, are cascaded by use of connectors. To facilitate the connection and disconnection of control lines between the constituents, all the signals sent to each constituents are transformed to serial signals within the constituent. Each constituent, therefore, interchanges signals with the associated controller by serial transmission.

Controller of Parts Supply System

FIG. 3 shows the controller of each parts supply system which confirms the parts stored in a tray by using the tray code and carrier code shown in FIG. 4B or 4C, while executing other various kinds of processing as well. As shown, the controller has a processor including a main memory, a table storage for storing the table of FIG. 4B or 4C, and an input/output (I/O) interface for receiving the outputs of the tray code sensor St and carrier code sensor as well as the outputs of the other sensors and outputs of the motors, actuators and other drive sources and indicators. When the table storage is implemented by part of the main memory, it is, of course, omissible. The controller is shown as executing processing in response to a command from a host which is the cell controller shown in FIG. 12. Alternatively, manual or automatic control means may be connected to the controller via the I/O interface in order to operate and control the parts supply system independently of the other equipment.

Figure 13:
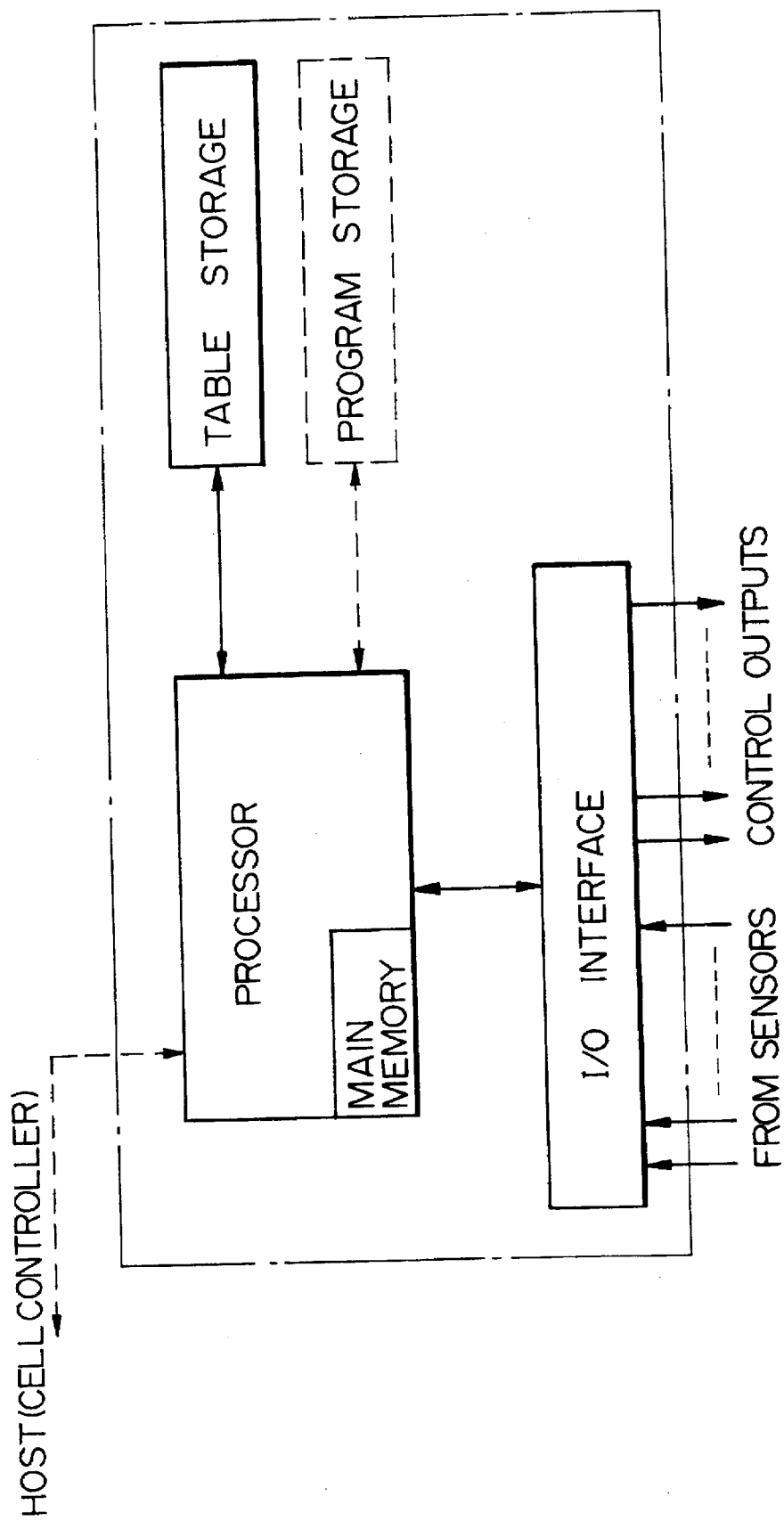
FIG. 13 is a block diagram schematically showing a controller built in the parts supply system.

The processor shown in FIG. 13 executes processing in accordance with a program received from the host or the control means together with a command or a program stored in suitable storing means, or program storage which will be described, beforehand. When the program contains parts codes designating parts, the processor transforms them to carrier codes, as described with reference to FIG. 4A. Assume that the table shown in FIG. 4B is used. Then, code sensors similar to the carrier code sensor Sc, FIG. 3, are respectively located at the parts supply position Ps and tray discharge position Po where the parts must be identified. The outputs of these sensors are sent to the processor via the I/O interface. The processor transforms a carrier mark Mc read by any one of such sensors to a carrier code Dc and references the table with the carrier code Dc so as to select a parts code Dt matching the carrier code Dc. On the other hand, when the table or shift register shown in FIG. 4C is used, the processor can easily identify the tray carriers C at the positions Ps and Po and the trays mounted thereon by reading the corresponding position data stored in the table storage of the controller, as discussed previously.

Assembly Control

To begin with, assembly control to be effected by the control system of the parts supply system will be outlined. Since the number of stock modules changes with a change in the number of kinds of parts, the constituents of the parts supply system are designed such that they can be individually mounted and dismounted with ease, as stated earlier. For this reason, control programs each matching a particular number of stock modules and connection pattern are prepared beforehand. At the beginning of the program, setting and selection are effected on the basis of the connection pattern. The cell controller recognizes and stores the statuses of the robot and tray changer and, based n such data, sequentially sends operation commands thereto. The cell controller monitors the operations of the constituents while the latter is in operation.

Basically, a single cycle in which one or more parts are supplied from the tray of the parts supply system to the robot consists of the following steps (1)–(7).

(1) The cell controller commands the controller of the parts supply system to set a tray carrier carrying a tray containing required parts at the parts supply position Ps. At this instant, the cell controller designates the parts by using a parts code.

(2) The controller of the parts supply system references the table, FIG. 4B or 4C, to transform the received parts code to a carrier code, sets the tray carrier having the carrier code at the position Ps, and then sends an end-of-setting code to the cell controller.

(3) The controller of the parts supply system confirms the kind of parts stored in the tray set at the position Ps on the basis of the parts code and carrier code which are stored in the position of the shift register, FIG. 4C, corresponding to the position Ps. When use is made of the table shown in FIG. 4B, the confirmation will be effected on the basis of a carrier code read by the sensor at the position Ps.

(4) On confirming the parts at the position Ps, the controller of the parts supply system sends a confirmation signal to the cell controller. In response, the cell controller sends to the robot a command designating a program matching the content of operation.

(5) The robot selects, among the programs stored therein, the program designated by the cell controller, executes the program, and then sends an end-of-processing signal to the cell controller.

(6) The cell controller sends to the controller of the parts supply system a signal indicating that the robot has picked up one or more parts.

(7) The controller of the parts supply system releases the tray carrier located at the position Ps.

After the step (7), the program returns to the step (1) for locating the next tray carrier on the circulation path or the tray carrier loaded with parts to be supplied next at the position Ps. The above procedure is repeated a number of times corresponding to the number of parts to be assembled.

Individual Processing

Figure 14:
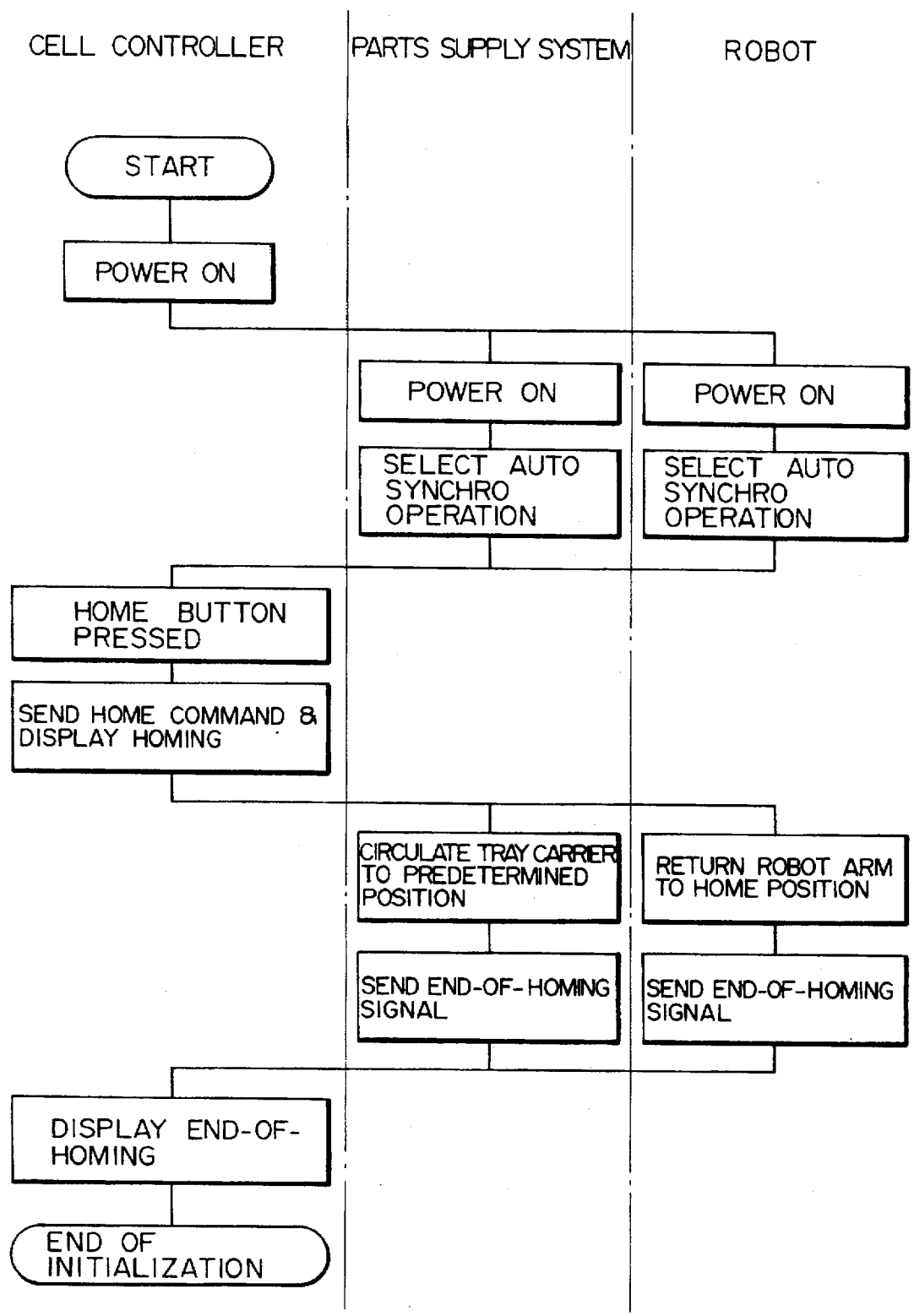

FIG. 14 demonstrates a preliminary procedure for the cell controller to initialize the parts supply system and robot. As shown, when the power supply to the cell controller is turned on, the cell controller commands the parts supply system and robot to turn on their power supplies and conditions them for automatic synchronous operation. Then, the operator presses a HOME button for causing all the constituents to return to the respective home positions. Specifically, the robot arm and cylinders are returned to the respective initial positions while the tray changer is moved to locate a certain tray carrier at the tray loading position Pi and then stopped. Thereafter, the controllers of the parts supply system and robot send respective end-of-homing signals to the cell controller. In response, the cell controller displays such a condition. The system is now ready to operate.

A reference will be made to FIGS. 15 and 16 for describing how one part is picked up from a tray and mounted to a work. Let the controllers of the parts supply system and robot be respectively referred to as the parts supply system and robot themselves in order to avoid complexity, except for exceptional cases. Assume that the cell controller has confirmed the arrival of a work at the assembly position of the robot, the ready states of the peripherals, etc. Then as shown in FIG. 15, the cell controller sends to the parts supply system an assembly start signal for commanding the tray changer to start assembly, a signal representing the kind of parts to be used and implemented as a parts code, and a command signal for causing the parts of interest to be set at the parts supply position Ps. The parts supply system converts the parts code to a carrier code by referencing the table and then determines whether or not the carrier code is identical with the carrier code of the tray carrier located at the position Ps. If the former is not identical with the latter, the system causes the tray changer to circulate the tray carriers until the two carrier codes match.

For the circulation of trays, the belts $70_1$ and $70_2$, FIG. 9 are driven at high speed at first. When a deceleration sensor, not shown, senses one tray carrier 62 at a position short of the parts supply position Ps, the belts $70_1$ and $70_2$ are decelerated. As the tray carrier 62 advances on the circulation path, a stop position sensor, not shown, located at the position Ps senses it. Then, the motor 80 is deenergized while a mechanical brake is applied, thereby stopping the tray carrier 62 at the position Ps. When the carrier code of the tray carrier brought to the position Ps is identical with or has coincided with the carrier code derived from the parts code, the parts supply system positions the tray of the tray carrier 62 and then returns to the cell controller an end-of-positioning signal and the parts code of the parts located at the position Ps. In this case, the parts code may be produced from the carrier code or may be implemented by the designated parts code only if the two part codes are identical. To position the tray, the plungers of the cylinders 82, FIG. 9, are pressed against the side wall of the tray via the through holes of the tray carrier 62.

The cell controller compares the received parts code with the original parts code and, if the former is not identical with the latter, disables the system. If they are identical, the cell controller sends to the robot a pick-up command designating a pick-up program which matches the configuration and position of the parts to be picked up and stored in the tray. It is to be noted that the pick-up program describes all the information necessary for operation, e.g., the coordinates table listing the positions of parts in the tray, the kinds of hands to use, and the coordinates representing mounting positions. The robot picks up one part in accordance with the pick-up program, shifts the coordinates of the coordinates table listing the positions of parts in the tray and written to the controller of the robot by one, and then sends an end-of-picking signal to the cell controller. If the position of the part picked up is not the last position as determined by the shift of the coordinates table, the robot sends an end-of-operation signal to the cell controller immediately. On the other hand, if the positioned mentioned above is the last position in the tray, the robot sends an idle tray signal and then the end-of-operation signal to the cell controller.

On receiving the idle tray signal, the cell controller commands the controller of the parts supply system to deliver, among the trays storing part of the same kind as the parts used up by the robot and stocked in one of the stock modules, from the stock module to the tray changer, although not shown in the figure. In response to an idle tray signal from the cell controller, the controller of the parts supply system memorizes that the tray at the position Ps is idle while matching it to the carrier code of the tray carrier, causes the separating mechanism of the stock module of interest to separate one tray, and causes the stock module and outlet lifter to convey the separated tray to the receiving mechanism of the tray changer. Of course, a tray prepare signal may be generated when one or two parts, as counted from the last part, are left in the tray in order to deliver a full tray in advance.

Assume that the robot continuously picks up a plurality of parts from the same tray while sequentially mounting them to the work. Then, the cell controller supervises the number of parts to be picked up by the robot and causes the robot to repeat the same program. On picking up a required number of parts from the tray, the robot sends an end-of-picking signal to the cell controller.

In response to the end-of-operation signal, the cell controller starts executing the procedure shown in FIG. 16. As shown, the cell controller sends to the robot a mount start command designating a program which includes the mounting of the part picked up from the tray to the work. In response, the robot mounts the part to the work in accordance with the program. After sending the mount start command, the cell controller sends to the parts supply system the end-of-picking signal indicating that the robot has picked up the part. At this instant, if the cell controller has received the idle tray signal from the robot, it sends the idle tray signal to the parts supply device together with the end-of-picking signal. On receiving the end-of-picking signal, the tray changer releases the tray located at the position Ps and then circulates the tray carriers until the next tray carrier arrives at the position Ps. At this instant, if the parts supply system has received the idle tray signal from the cell controller, it writes information indicative of the idle tray therein. For example, a suitable code representing an idle state may be written to the table, FIG. 4B or 4C, in correspondence to the parts code and carrier code.

When the cell controller receives the end-of-operation signal from the robot and a signal, not shown, indicating the end of circulation from the parts supply system, it determines whether or not any other parts should be mounted to the work. If the answer of this decision is positive, the procedure returns from the point A of FIG. 16 to the point A of FIG. 15. If otherwise, meaning that one cycle has completed, the cell controller causes, for example, the work to be transferred to the platen 10 on the conveyor 11. The conveyor 11 extends to the next assembly system, warehouse or similar preselected location. Subsequently, the cell controller determines whether or not it has received a system stop command and, if it has not received the command, returns from the point B of FIG. 16 to the point B of FIG. 15. If otherwise, the cell controller sends a stop signal to the parts supply system and robot and, on confirming the stop thereof, ends the control.

It may occur that a condition wherein a tray carrier is empty should be set. Then, predetermined data, e.g., "0" meant for such a tray carrier may be stored in the table beforehand as a parts code corresponding to the tray carrier. This allows the empty tray carrier to be distinguished from the other tray carriers to be loaded with trays.

Figure 17:
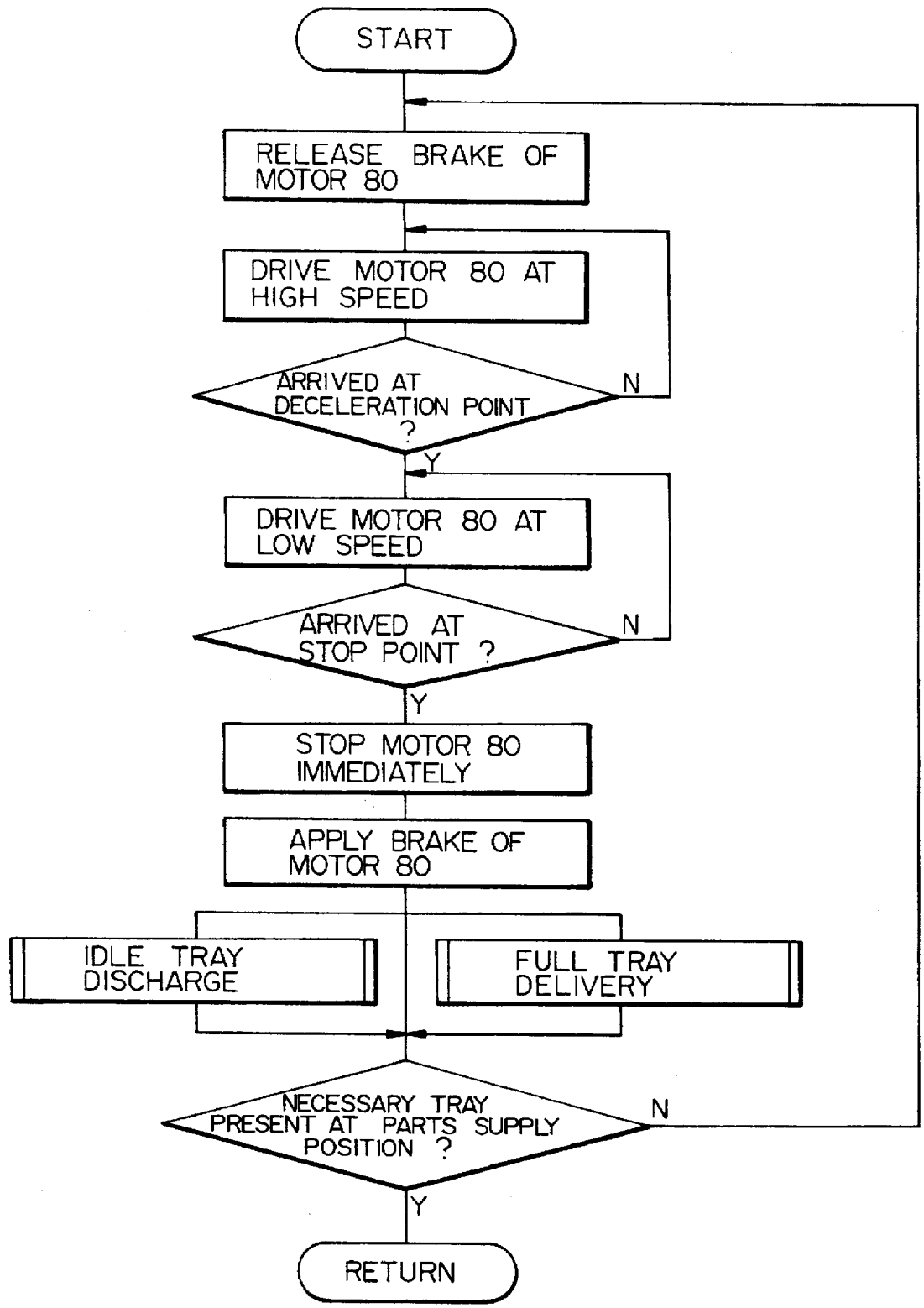

FIG. 17 shows a tray circulation and replacement procedure in which the tray changer circulates the tray carriers or discharges an idle tray from a tray carrier while feeding a full tray to the tray carrier. This procedure will be described with reference also made to FIG. 9. To circulate the tray carriers, the tray changer releases the brake of the motor 80, drives the motor 80 at a high speed, and then drives the motor 80 at a low speed when the sensor, not shown, determines that any one of the tray carriers has reached the deceleration point. As soon as the tray carrier arrives at the stop point by way of the deceleration point, the tray changer stops the motor 80 immediately and applies the brake to interrupt the circulation of the tray carrier. In the illustrative embodiment, the tray carriers $62_1$, $62_2$ and $62_4$ are brought to a stop at the tray loading position Pi, parts supply position Ps and tray discharge position Po, respectively, while the tray carrier $62_3$ is stopped at the bottom of the tray changer, as shown in FIG. 622. In this condition, if the tray at the position Po is idle, an idle tray discharge routine is executed, as will be described with reference to FIG. 18. If the tray carrier at the position Pi should be loaded with a full tray, a full tray delivery routine is executed, as will be described with reference to FIG. 19.

Again, when it is desired to set a condition wherein a tray carrier is empty should be set, predetermined data, e.g., "0" meant for such a tray carrier may be stored in the table beforehand as a parts code corresponding to the tray carrier. Then, whether or not a full tray should be delivered to the tray carrier located at the tray loading position Pi can be determined immediately by referencing the table. In addition, so long as the delivery of a full tray or the discharge of an idle tray does not occur, it is possible to skip the tray carrier, which should be idle, when it reaches the parts supply position Ps. This successfully increases the processing speed of the parts supply system. When the discharge of an idle tray or the delivery of a full tray is not necessary, the above processing is, of course, not executed. When both the idle tray discharge routine and the full tray delivery routine are required, they can be executed in parallel.

The tray changer determines whether or not the tray carrier $62_2$ located at the parts supply position Ps is loaded with a tray storing parts which should be picked up by the robot. If such a tray is present on the tray carrier $62_2$, the tray changer holds the tray carrier $62_2$ at the position Ps until the part has been picked up. If otherwise, the tray changer repeats the above procedure. Assuming that the table is implemented as the shift register, FIG. 4C, whether or not the tray at the position Ps stores the required parts can be determined on the basis of information relating to the parts code and carrier code stored at the position corresponding to the position Ps.

Figure 18:
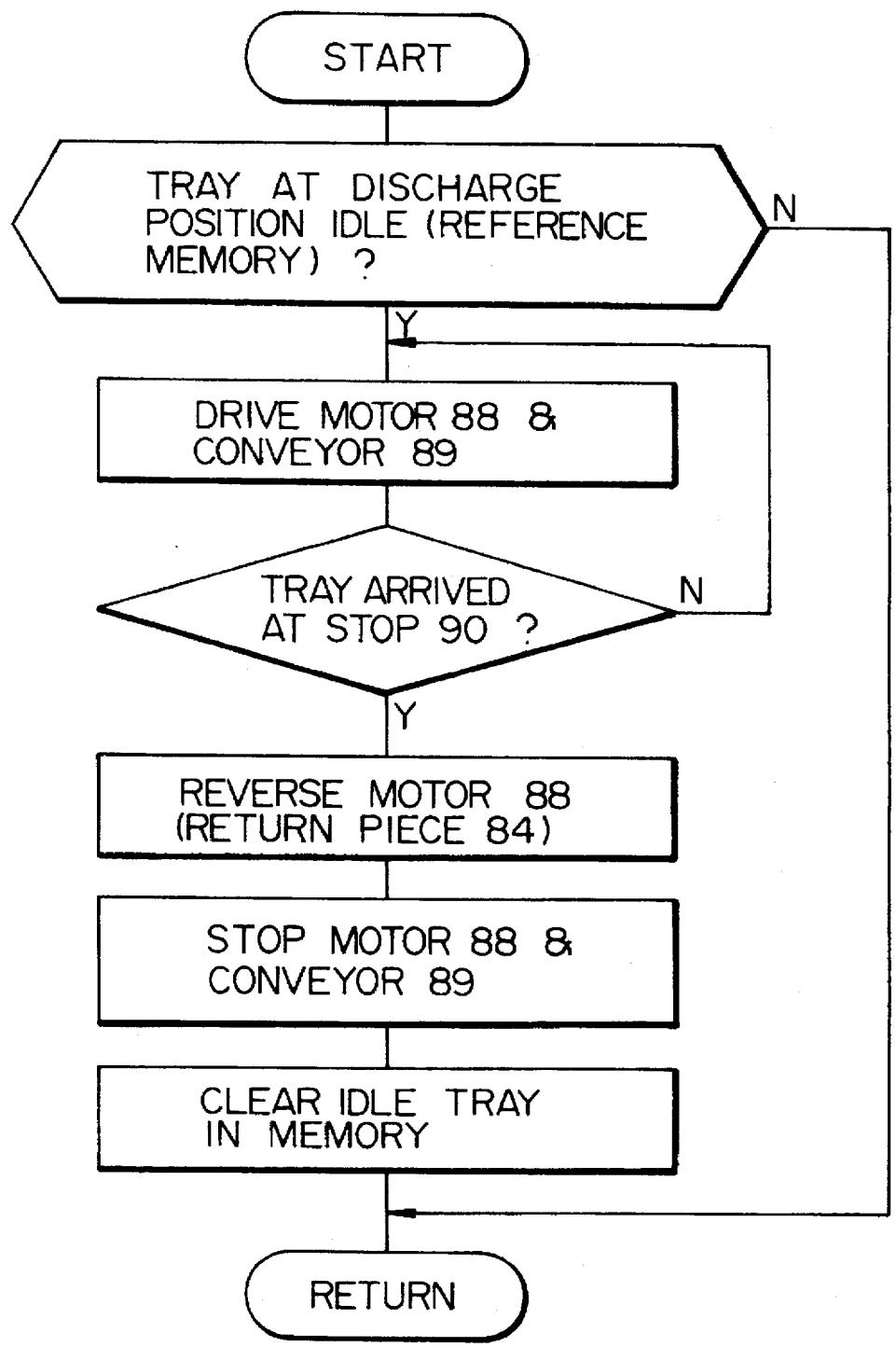

FIG. 18 shows the idle tray discharge routine included in the procedure of FIG. 17. The routine will be described with reference also made to FIG. 9. As shown, parts supply system references the information stored in the memory to see if the carrier brought to the tray discharge position Po is loaded with an idle tray. This can be done on the basis of the idle tray information stored in association with the parts code and carrier code, as stated earlier. When the table is implemented by the shift register, FIG. 4C, it is possible to determine whether the tray at the position Po is an idle tray by referencing the idle tray information matching the parts code and carrier code which are stored in the position of the table corresponding to the position Po. If the tray at the position Po is idle, the motor 88 is energized to rotate the belt 85. As a result, the pressing piece 84 affixed to the belt 85 rises and moves while pressing the idle tray at the rear through the notch formed in the bottom of the carrier 62. Hence, the idle tray is moved on the roller conveyor 89 until it abuts against the stop 90.

When the sensor, not shown, determines that the idle tray has abutted against the stop 90, the motor 88 is reversed to return the pressing piece 84 to the original position shown in FIG. 9. Then, the motor 88 and roller conveyor 89 are deactivated. Finally, the idle tray information stored in the table is cleared. If desired, information indicating that the tray carrier is idle may be written to the table, instead of clearing the idle tray information. Further, even the parts code matching the carrier code which is associated with the idle tray information may be cleared together with the idle tray information.

Figure 19:
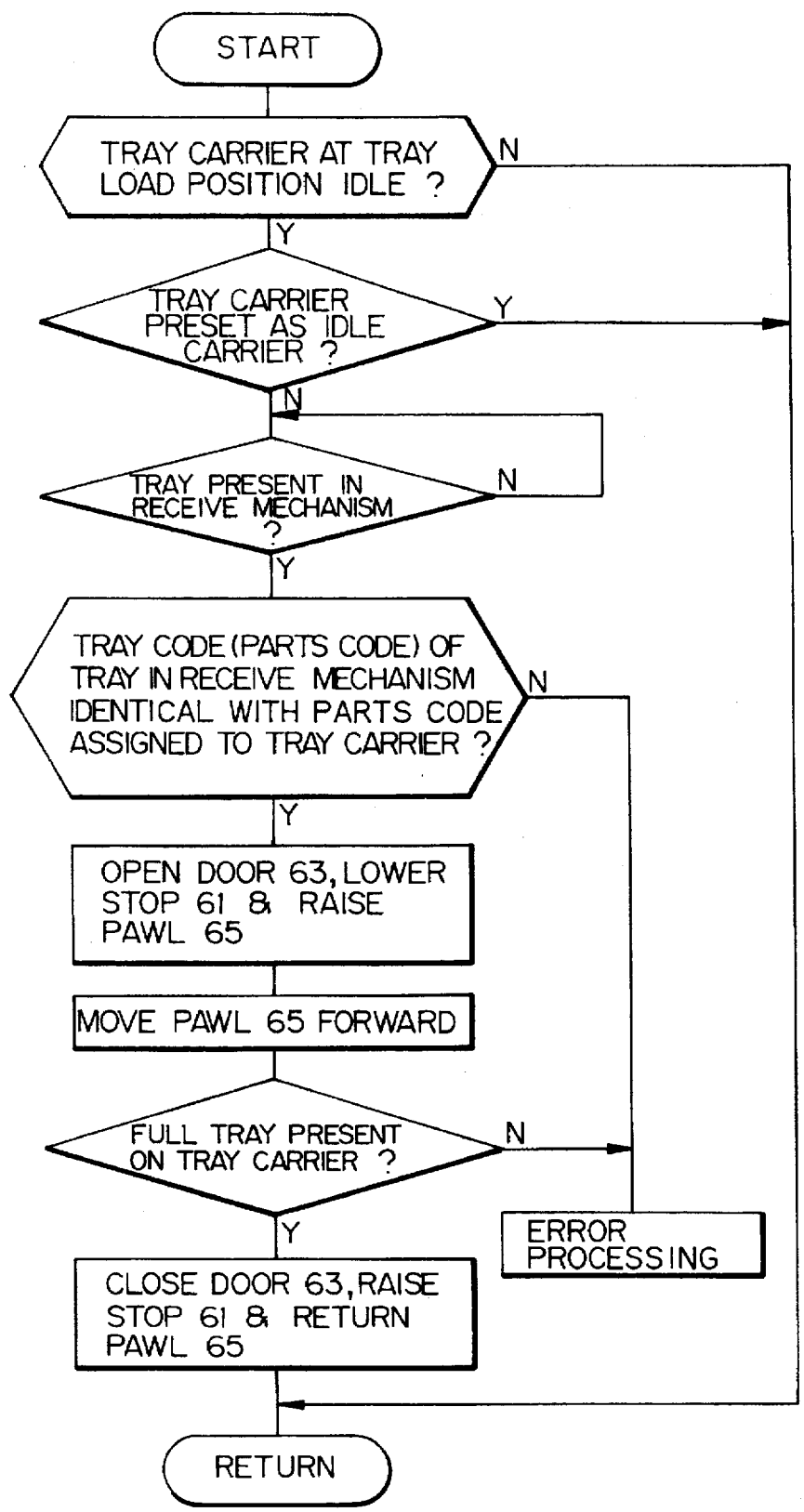

FIG. 19 shows the full tray delivery routine also included in the procedure of FIG. 17. This routine will be described with reference also made to FIG. 9. As shown, on the arrival of a tray carrier at the tray loading position Pi, the controller determines whether or not it is loaded with a tray on the basis of the above-stated information stored in the memory. If the tray carrier is loaded with a tray, the controller returns immediately. If otherwise, the controller determined whether or not the program commands the delivery of a full tray to the idle tray carrier. If the answer of this decision is negative, the controller returns immediately. If otherwise, the controller determines whether or not a tray is present in the tray receiving mechanism of the tray changer including the roller conveyor 60. If no trays are present, the controller waits until a tray has been delivered from the stock module of interest.

If a tray is present in the receiving mechanism or if a tray arrives at the stock module, the controller compares a parts code assigned to the tray carrier with a parts code provided on the tray and read by the sensor 68. If the two part codes are not identical, the controller disables the parts supply system. If they are identical, the controller starts on the delivery of the tray to the idle tray carrier. Specifically, the controller opens the door 63, FIG. 10B, of the tray carrier 62, lowers the stop 61 of the receiving mechanism, raises the pawl 65, and then moves the pawl 65 forward via the cylinder 66. As a result, the tray is forced into the tray carrier 62. Thereafter, the door 63 is restored to the original position by the spring, thereby retaining the tray on the tray carrier 62. Then, the stop 61 is raised to obstruct the next tray. Finally, the cylinder 66 is returned to the position shown in FIG. 9, and the pawl 65 is lowered.

Figure 20:
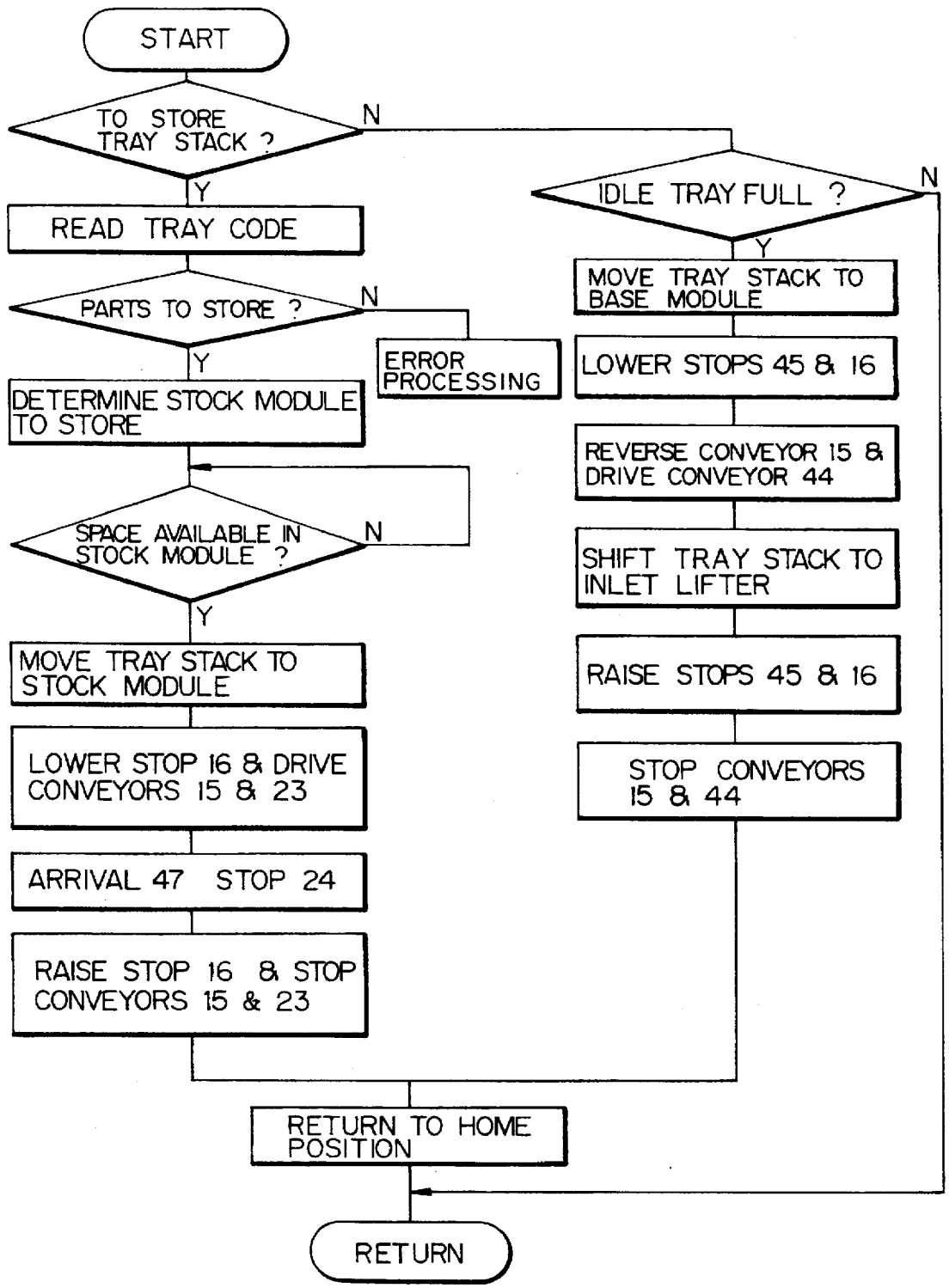

FIG. 20 shows a procedure for loading the inlet lifter 2, FIG. 6, with a stack of full trays and transferring a stack of idle trays. This will be described with reference also made to FIGS. 6, 7A, 7B, and 11. The inlet lifter 2 is assumed to be initially located at a height where it can receive a stack of full trays from, for example, an unmanned vehicle, e.g., the height of the stock module $8_3$, FIG. 2. When a stack of full trays are transferred from the vehicle to the inlet lifter 2, the sensor $20_1$ reads a tray code (parts code) provided on the bottom of the lowermost tray. In response to the output of the sensor 201, whether or not the tray stack is one which should be stocked in any one of the stock modules $8_1$–$8_3$ is determined. If the answer of this decision is negative, the device is disabled. If otherwise, one of the stock modules $8_1$–$8_3$ which should be loaded with the tray stack is selected, and whether or not a space for stocking the tray stack is available in the stock module selected is determined. If such a space is not available, the inlet lifter waits while holding the tray stack thereon. This, however, does not occur in practice since the supply of a full tray stack is requested as soon as the space is produced.

If the stock module selected is the stock module $8_3$, the inlet lifter 2 lowers the stop 16 at the current position. When the stock module $8_1$ or $8_2$ is selected, the inlet lifter 2 lowers the stop 16 after moving to the position of such a stock module. Then, the belt conveyor 15 and the roller conveyor 23 of the stock module 8 are driven to convey the tray stack toward the stock module 8 selected. When the sensor, not shown, determines that the tray stack has arrived at the stop 24 located at the end of the roller conveyor 23, the stop 16 is raised while the conveyors 15 and 23 are stopped. In this condition, the tray stack is stocked on the conveyor 23. Thereafter, the inlet lifter 2 returns to the initial position and stops there.

On the other hand, when idle trays are tacked on the stacking mechanism of the base module 7 to above a predetermined height, the inlet lifter 2 transfers the idle tray stack from the base module to one of the stock modules via which the stack should be conveyed to the outside, e.g., the stock module $8_3$, as shown at the right-hand side of FIG. 20. Specifically, in the above condition, the inlet lifter 2 moves downward to the inlet lifter space $7_1$ of the base module 7. The stops 45 and 16 of the base module 7 and inlet lifter 2, respectively, are lowered or retracted. Subsequently, the roller conveyor 44 of the base module 7 is driven while the belt conveyor 15 of the base module 7 is reversed. As a result, the idle tray stack on the roller conveyor 44 of the base module 7 is moved until it abuts against the stop 46. Then, the stops 16 and 45 of the inlet lifter 2 and base module 7, respectively, are raised while the conveyors 15 and 44 are stopped. The inlet lifter 2, holding the idle tray stack thereon, moves to the position of the stock module $8_3$, i.e., the initial position and awaits the transfer of the stack to the outside.

Figure 21:
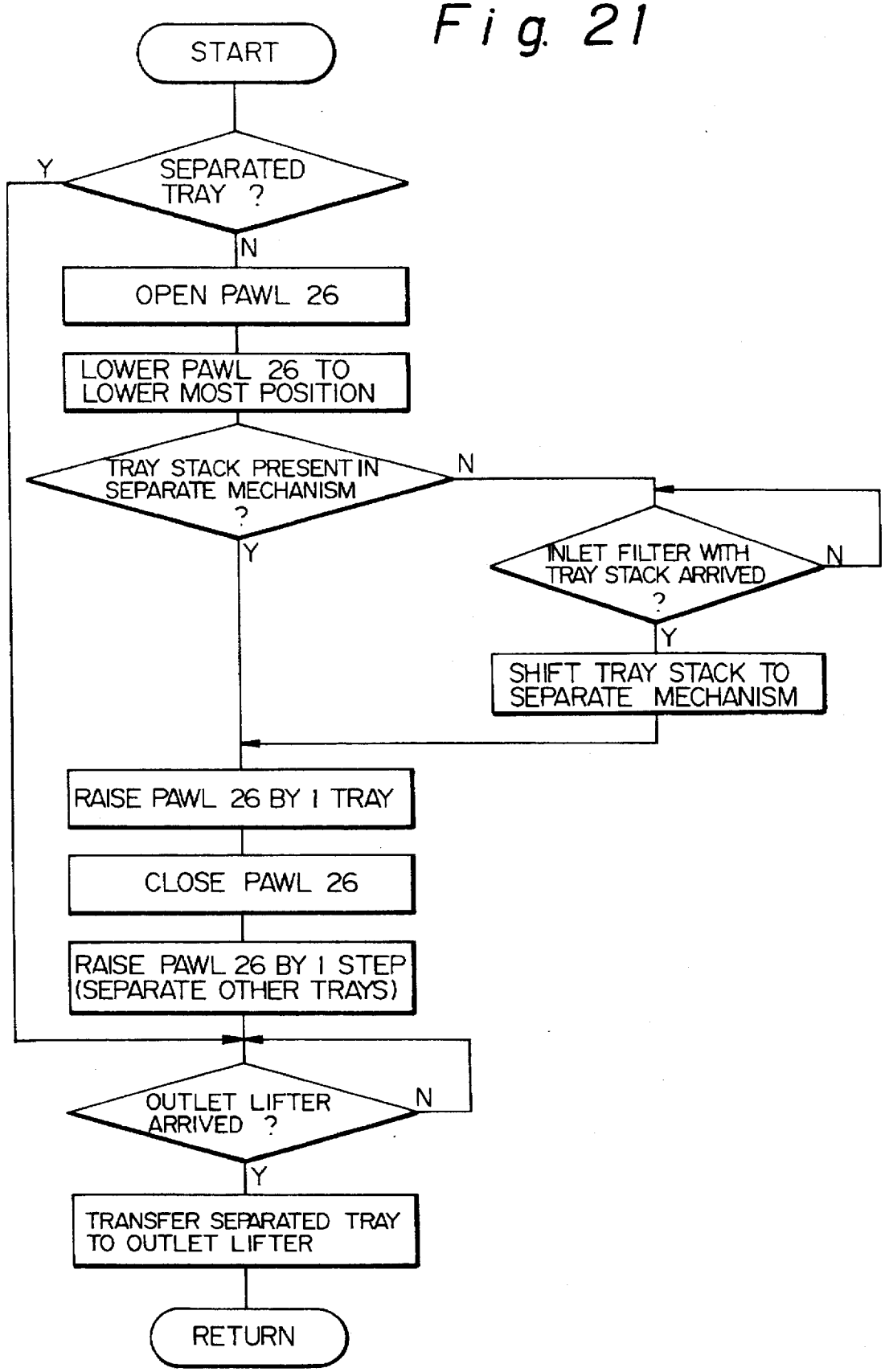

FIG. 21 shows a procedure for separating one full tray from the tray stack stocked in the stock module 8 and transferring it to the outlet lifter 6. This will be described with reference also made to FIGS. 7A and 7B. First, whether or not a single tray, i.e., a tray having been positioned on the top of a tray stack is present on the belt conveyor 25 of the separating mechanism with all the other or underlying trays delivered to the tray changer is determined. If the answer of this decision is positive, the single tray is directly transferred to the outlet lifter 6. If a plurality of full trays are stacked on the belt conveyor 25, one of them is separated, as follows. For the separation, the pawls 26 are opened and then lowered to the lowermost position. Then, whether or not a tray stack is present on the belt conveyor 25 is determined. If not tray stacks are present on the conveyor 25, the outlet lifter 6 waits the delivery of a tray stack from the inlet lifter.

Specifically, when a tray stack is present on or brought to the belt conveyor 25 from the inlet lifter 2, the pawls 26 are raised to a height higher than a height corresponding to a single tray, but lower than, when two trays are stacked, the lower edge of the flange of the overlying tray. This height is, for example, 45 mm to 75 mm for a stack of S trays or 125 mm to 235 mm for a stack of L trays, as shown in FIG. 5B. Then, the pawls are closed and raised to a level over a height corresponding to at least one tray above the upper surface of the belt conveyor 25. At this instant, the pawls 26 abut against the flange of the second tray from the bottom and raise the trays overlying the bottom tray. As a result, only the bottom tray is left on the conveyor 25. This tray, like the previously stated single tray, is transferred to the outlet lifter 6 by the conveyor 25. Specifically, after the outlet lifter 6 has moved to the stock module in which the bottom tray has been separated from the others, the conveyors 25 and 47 of the stock module and outlet lifter 6, respectively, are driven to transfer the tray from the stock module to the lifter 6.

Figure 22:
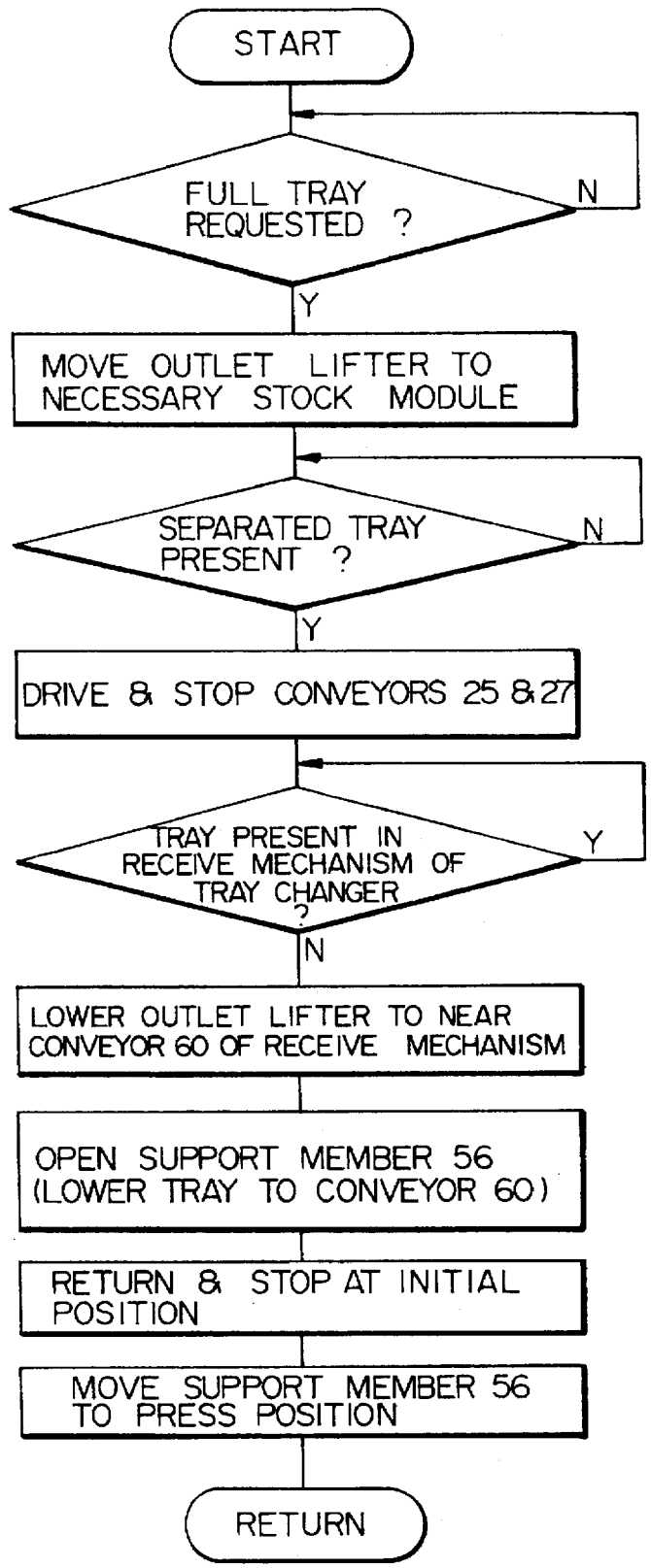

FIG. 22 demonstrates how the outlet lifter 6 receives the tray from the stock module 8 and transfers it to the receiving mechanism of the tray changer. As shown, when the cell controller requests the parts supply system to deliver a full tray to the tray changer, the outlet lifter 6 is moved to the position of the stock module 8 stocking parts to be delivered. At this position, the outlet lifter 6 waits until a single tray has been separated from the others by the procedure described with reference to FIG. 21. When a single tray is left on the belt conveyor 25 of the separating mechanism of the stock module 8, the conveyors 47 of the outlet lifter 6 are pressed against the tray. Then, these conveyors 47 and the conveyor 25 are driven to convey the tray until it has been held by the support members 56. After the absence of a tray in the receiving mechanism of the tray changer has been confirmed, the outlet lifter 6 holding the tray is lowered to a position close to the roller conveyor 60, FIGS. 4A–4C and 9, arranged on the top of the tray changer 4. Subsequently, the support members 56 are opened by the cylinders 54 with the result that the tray is laid on the conveyor 60. Thereafter, the outlet lifter 6 is again raised to the initial position adjoining the top stock module, and the support members 56 are returned to their position for pressing a tray.

Figure 23:
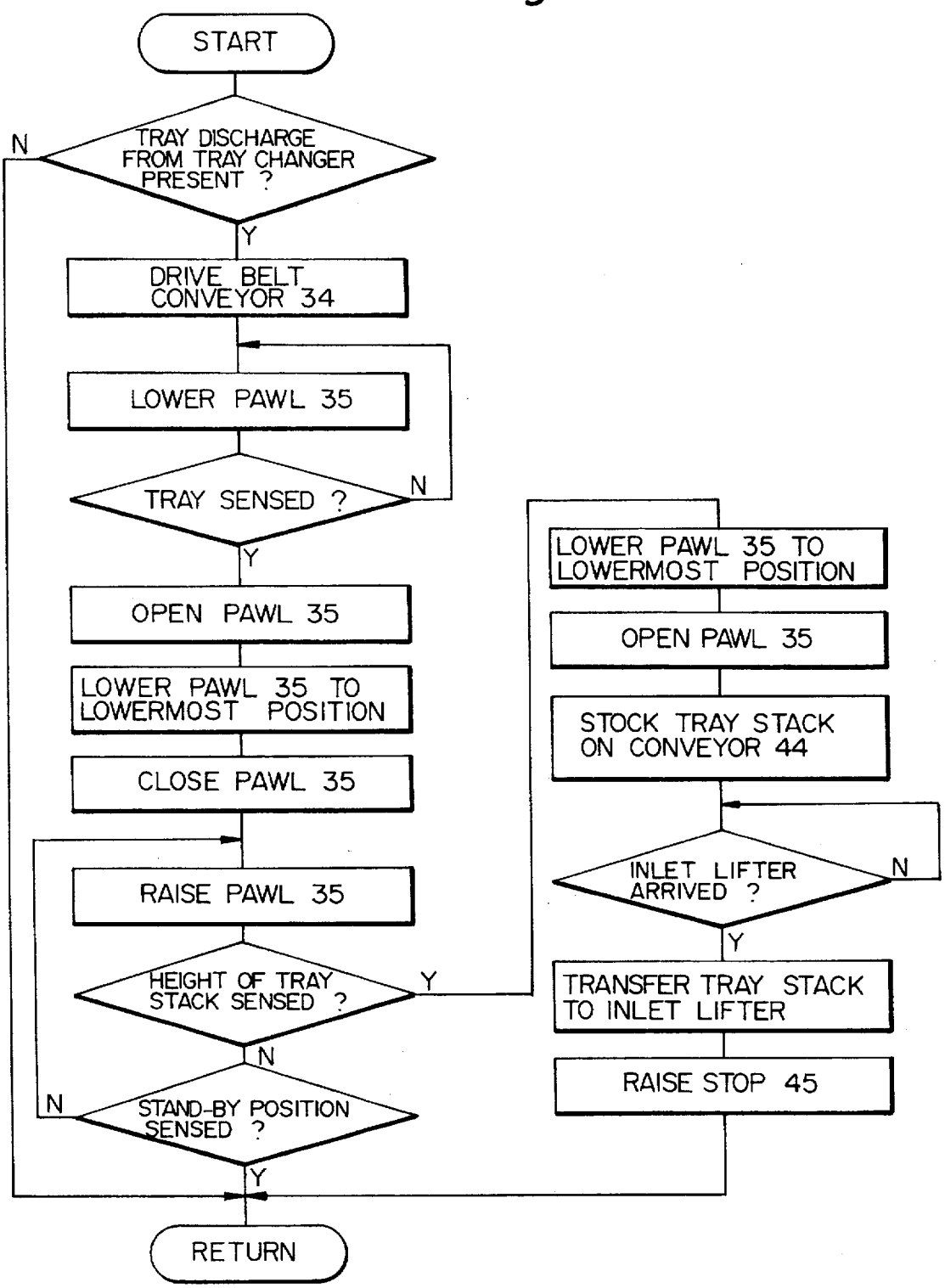

FIG. 23 shows a procedure in which the base module 7 stacks idle trays and discharges them to the outside of the parts supply system. Before this procedure begins, the pawls 35 of the base module 7 are held open and located at a height where they do not interfere with an idle tray to be stacked. As shown, when an idle tray is discharged from the tray changer, the belt conveyor 34 is driven to receive it in the stacking mechanism of the base module 7. The pawls 35 are lowered to a position where the sensor included in the means for moving the pawls 35 senses the idle tray. If the height of a tray is written to the table, FIG. 4B or 4C, in addition to a parts code corresponding to a carrier code, the height of a tray to be discharged from the tray changer can be determined beforehand, as stated earlier. When the pawls reach the above-mentioned position, the rotary actuators 39 are energized to open the pawls 35. As a result, the pawls 35 are released from a stack of idle trays which it has sustained. These trays are stacked on the idle tray driven out of the tray changer. Subsequently, the pawls 35 in the retracted position are moved downward to the lowermost position which is lower than the flange of the thinnest tray. In this condition, the rotary actuators 39 are again energized to cause the pawls 35 to protrude or close. Then, the pawls 35 are raised to abut against the underside of the flange of the tray driven out of the tray changer.

Assume that when the idle trays sustained by the pawls 35 are lowered onto the new idle tray, the upper limit switch, not shown, does not sense a tray. Then, the pawls 35 are raised to a height where they will not interfere even with an L tray having the maximum height. However, when the upper limit switches senses a tray, the pawls 35 are lowered to the lowermost position and opened. At the same time, the stop 36 is collapsed. In this condition, the belt conveyor 35 is driven to transfer the stack of idle trays from the conveyor 34 to the roller conveyor 44.

If the idle tray stack is allowed to be driven out of the parts supply device at the height of the roller conveyor 44, the conveyor 44 should only be extended to a position close to the right end of the base module 7. However, the illustrative embodiment discharges the idle tray stack from the parts supply system to, for example, an unmanned vehicle at the position of the bottom stock module 81, as stated previously. Hence, it is necessary to convey the idle tray stack to the stock module $8_1$. For this purpose, when the idle tray stack stocked on the roller conveyor 44 is pushed by the following idle tray tack driven out of the stacking mechanism until it abuts against the stop 45, the cell controller commands, in response to the output of the sensor 451, the parts supply system to move the inlet lifter 2 to the position of the base module 7. As soon as the inlet lifter 2 is moved to the base module 7, the stop 45 is lowered while the roller conveyor 44 and the belt conveyor 15 of the inlet lifter 2 are driven at the same time. As a result, the idle tray stack is transferred from the base module 7 to the inlet lifter 2. At this instant, the stop 16 of the inlet lifter 2 is, of course, so positioned as not to obstruct the transfer of the idle tray stack. Subsequently, the stop 45 of the base module 7 is raised to prevent the following idle tray stack from entering the inlet lifter space 71 of the base module 7.

In a tray changer to which the present invention is applicable, particular parts should preferably be supplied to a robot smoothly in the order in which the robot uses them. For this purpose, it is preferable that trays be loaded onto tray carriers in a particular order such that trays loaded with necessary parts are sequentially arranged on a circulation path.

In summary, it will be seen that the present invention provides a parts supply system having various unprecedented advantages, as enumerated below.

(1) Trays for supplying parts to a robot are moved on a circulation path, including a parts supply position, by a circulation mechanism. Hence, parts can be sequentially supplied to the robot only if the trays are sequentially shifted in one direction. It follows that even when the kind of parts to be supplied is changed, a method of controllably driving the circulation mechanism does not have to be changed. This successfully reduces an extra processing time attributable to a change in the kind of parts to a significant degree.

(2) A path for delivering full trays to the circulation path and a path for discharging idle trays are set up independently of each other. This prevents full trays and idle trays from conflicting each other and thereby simplifies the construction while reducing a tray replacing time.

(3) A plurality of tray carriers are sequentially moved on the circulation path via the parts supply position, so that parts of different kinds can be sequentially supplied from the trays mounted on the tray carriers to the robot. Therefore, the waiting time of the robot is noticeably reduced when a plurality of kinds of parts are used.

(4) An arrangement may be made such that when one tray carrier is located at, for example, a tray loading position, another tray carrier is located at one or both of the parts supply position and a tray discharge position. Then, it is possible to load a tray carrier with a tray, cause the robot to pick up one part, and discharge an idle tray at the same time, thereby substantially reducing the time necessary for such processing.

(5) The tray carriers and parts codes of parts stored in the trays respectively mounted on the carriers are stored in pairs as a table. Hence, by reading only a carrier code provided on a tray carrier, i.e., without directly reading a code provided on a tray mounted on the tray carrier, it is possible to determined the kind of parts.

(6) The table may be implemented by a shift register so as to shift carrier codes and parts codes in response to the circulation of the tray carriers. This accurately matches the positions of the data in the shift register to the actual positions of the tray carriers on the circulation path. Hence, only if the kinds of parts stored in the trays and the tray carriers are memorized in pairs at the position for loading a tray carrier with a tray, the kind of parts located at any particular position, where it must be confirmed, can be confirmed with reference only to the data stored in the shift register.

(7) Even when the number and/or combination of modules constituting the parts supply system is changed, wirings and connections can be readily changed. In addition, a manual control device is removably mounted to the device to allow the individual constituent to be operated in the event of adjustment or trouble shooting.

(8) A plurality of parts supply systems share a manual control function. Any one of such parts supply systems can be selected by selecting means and controlled independently of each other via a removable manual operating device.

(9) The number of parts can be increased or decreased only if the number of stock modules is changed. The stock modules and control means are extremely simple in construction.

Various modifications will become possible for those skilled in the art after receiving the teachings of the present disclosure without departing from the scope thereof.

What is claimed is:

1. A parts supply system comprising:
a plurality of trays loaded with parts;
a storing section for storing the trays loaded with parts, said storing section including stationary conveying means for conveying said trays from said storing section; and
a circulation mechanism including tray carriers and for circulating the tray carriers along a closed-loop circulation path which includes at least a tray loading position at which trays conveyed from said storing section are mounted onto said tray carriers, a parts supply position from which said trays mounted onto said tray carriers are positioned directly after the tray loading position and from which parts stored in a tray are picked up as each tray is sequentially circulated to this position via said circulation mechanism, and a discharge position from which said trays mounted onto said tray carriers are positioned after the parts supply position and an intervening waiting position, at which discharge position the trays are discharged from the circulation mechanism into said storing section, such that the trays remain on the closed-loop circulation path during the entire time they are within the circulation mechanism.

2. A system as claimed in claim 1, wherein said plurality of tray carriers are spaced apart by a fixed distance from each other in a closed loop such that when one of said tray carriers is located at said tray loading position, another of said tray carriers is located at said parts supply position and another of said tray carriers is located at said tray discharge position.

3. A system as claimed in claim 2, wherein a tray is sequentially circulated in the circulation mechanism to said tray loading position, said parts supply position, and said tray discharge position.

4. A system as claimed in claim 3, wherein said closed loop, said tray discharge position is located below said tray loading position while said parts supply position and said tray loading position are substantially parallel to each other.

5. A system as claimed in claim 1, further comprising a plurality of groups of trays each of which is arranged in a stack and stores identical parts, wherein one tray is separated from each stack and mounted to a tray carrier.

6. A system as claimed in claim 5, wherein said storing section stores said plurality of groups of trays on a group basis and stacks the trays of each group in a vertical direction.

7. A parts supply system comprising:
a storing section for storing a plurality of groups of trays on a group basis, and storing each of said plurality of groups of trays in a vertical stack;
a discharging section for discharging a needless tray to a bottom of said storing section;
a conveyor section for conveying vertically a tray separated from said plurality of groups;
a circulating section for sequentially circulating tray carriers to a tray loading position for receiving a tray conveyed by said conveyor section, a parts supply position from which parts stored in a tray are picked up, and a tray discharge position for discharging a needless tray, said circulating of said tray carriers forming a closed loop on which the trays circulate during the entire time they are within the circulating mechanism, such that said trays move from said tray loading position directly to said parts supply position and then to said discharge position after an intervening waiting position, said tray discharge position being located below said tray loading position and said parts supply position and said tray loading position being substantially parallel to each other; and an outlet section for conveying a needless tray from said tray discharge position to said discharging section.

8. A system as claimed in claim 7, wherein said tray carriers are sequentially circulated to said parts supply position in an order in which said tray carriers are to be used at said parts supply position.

9. A system as claimed in claim 7, wherein among the trays mounted on said tray carriers, an emptied tray is transferred to said discharging section at said tray discharge position by said outlet section, then a tray loaded with a same kind of parts as parts picked up from said empty tray is transferred from said plurality of groups of trays to one of said tray carriers, and then said tray carriers are rotated such that a position where said empty tray was located before discharge is said tray loading position.

* * * * *